United States Patent [19]

Masumoto

[11] Patent Number: 5,425,520
[45] Date of Patent: Jun. 20, 1995

[54] CORNER BRACKET FOR USE IN A SECTIONAL SHELF

[75] Inventor: Sakae Masumoto, Suita, Japan

[73] Assignee: Hideki Ueda, Nara, Japan

[21] Appl. No.: 17,287

[22] Filed: Feb. 12, 1993

[30] Foreign Application Priority Data

| Mar. 18, 1992 | [JP] | Japan | 4-014644 U |
| Mar. 30, 1992 | [JP] | Japan | 4-017704 U |
| Apr. 7, 1992 | [JP] | Japan | 4-021142 U |
| Apr. 20, 1992 | [JP] | Japan | 4-025209 U |

[51] Int. Cl.⁶ .......................................... F16M 13/00
[52] U.S. Cl. ................................ 248/247; 403/170; 403/231; 52/282.2; 52/280; 248/188
[58] Field of Search ............... 248/247, 248, 300, 188; 403/231, 247, 260, 170, 217; 52/280, 281, 282.2; 211/183, 191

[56] References Cited

U.S. PATENT DOCUMENTS

| 3,281,104 | 10/1966 | Hamilton | 211/183 X |
| 3,749,343 | 7/1973 | Marshak | 248/188 |
| 4,032,242 | 6/1977 | Morris | 403/231 |
| 4,120,600 | 10/1978 | Rees | 403/231 |
| 4,124,186 | 11/1978 | Call, Sr. | 403/231 X |
| 4,347,015 | 8/1982 | Olashaw | 403/231 X |
| 4,846,079 | 7/1989 | Ajax | 248/188 X |

FOREIGN PATENT DOCUMENTS

| 0172111 | 2/1986 | European Pat. Off. . |
| 663288 | 12/1951 | United Kingdom . |
| 861575 | 2/1961 | United Kingdom . |
| 983455 | 2/1965 | United Kingdom | 403/231 |
| 1536839 | 12/1978 | United Kingdom . |
| 2140670 | 1/1984 | United Kingdom | 211/183 |

*Primary Examiner*—Karen J. Chotkowski
*Attorney, Agent, or Firm*—Fish & Richardson

[57] ABSTRACT

On a side face of a corner bracket are formed a common insertion hole for a bolt, a stepped portion having a contact face and a contact edge which come to contact with a side wall of a strut and a side board of a shelf board, a strut projected portion engageable with an engaging hole defined in the side wall of the strut, and a board projected portion engageable with an engaging hole defined in the side board of the shelf board. The stepped portions are formed so as to extend entirely over a lower portion of the side face and to project outward. The side face of the corner bracket extends outside a line connecting between the strut projected portion and the board connecting portion formed thereon. Accordingly, the corner bracket is capable of reinforcing effectively a joint portion of the shelf board and the strut in a simple construction, and of preventing effectively an undesirable shaking of this joint portion.

3 Claims, 22 Drawing Sheets

CORNER BRACKET FOR USE IN A SECTIONAL SHELF

BACKGROUND OF THE INVENTION AND RELATED ART STATEMENT

This invention relates to a corner bracket for use in a sectional shelf which is detachably assembled from shelf boards and struts.

Normally, a sectional shelf is formed by arranging four struts each made of an angle steel member at four corners of a rectangular contour, and joining a shelf board made of thin steel plate with these struts. In order to strengthen the joint portion between the struts and the shelf board, a corner bracket is normally mounted at each joint portion of the strut and the shelf board.

FIG. 35 is a perspective view showing a state where the conventional corner bracket used for the above purpose is mounted between the strut and the shelf board. The corner bracket 23 includes wing members. An angle formed by the two wing members is substantially 90°. Each wing member is formed into a triangular figure, and has an insertion hole defined at each of three corner portions thereof. Insertion holes corresponding to these insertion holes of the wing member are defined in each of a side wall 24 of a strut 21 and a side board 25 of a shelf board 22.

A bolt is inserted through these insertion holes, and an unillustrated nut is spirally fitted to the bolt. In this way, the strut 21 and the shelf board 22 are joined with each other. In other words, there is realized a three-point engaging structure which is strong dynamically. With this structure, the strut 21 and the shelf board 22 are positioned reliably perpendicular to each other, thereby preventing effectively the sectional shelf from deforming upon being subjected to an external force.

Further as shown in FIG. 36, there are cases where a planer triangular member is used as a corner bracket 23. In this corner bracket 23 are defined three insertion holes similar to the wing member of the corner bracket shown in FIG. 35. This corner bracket 23 is also mounted between the side wall 24 of the strut 21 and the side board 25 of the shelf board 22, and these three members are integrally joined with one another by a bolt.

Each of these corner brackets 23 has three engaging portions per wing member thereof: a common engaging portion for joining the strut 21, the shelf board 22, and the corner bracket 23 with one another; a board engaging portion for joining the corner bracket 23 with the shelf board 22; and a strut engaging portion for joining the corner bracket 23 with the strut 21. The common engaging portion and the board engaging portion are arranged in a horizontal direction. The common engaging portion and the strut engaging portion are arranged in a vertical direction. A portion of the wing member between the strut engaging portion and the board engaging portion acts dynamically as a clamp against the external force subjected to the shelf board 22.

However, in the conventional corner bracket 23 as described above, a hypotenuse edge portion of the triangular wing member is located inward of a line connecting the strut engaging portion and the board engaging portion (hereinafter referred to as a clamping line). Thus, when a heavy article is placed on the shelf board 22 or a horizontally acting force is subjected to the shelf board 22 in a state where the corner brackets 23 are mounted on the joint portions of the struts 21 and the shelf board 22 and the bolts are inserted through the aforementioned insertion holes to join the struts 21 with the shelf board 22, the stress concentrates on the hypotenuse edge portions of the corner brackets 23.

If the hypotenuse edge portion of the corner bracket 23 resisting against the bending moment subjected to the shelf board 22 is located inward of the clamping line between the strut engaging portion and the board engaging portion, the bending load is entirely applied to the hypotenuse edge portion and the stress concentrates thereon. Accordingly, the corner bracket is deformed unless having sufficient rigidity, with the result that the sectional shelf may incline in a certain direction.

SUMMARY OF THE INVENTION

In view of the problems residing in the prior art, it is an object of the invention to provide a solid corner bracket for use in a sectional shelf capable of suppressing deformation of the sectional shelf more effectively than the prior art.

Accordingly, the invention is directed to a corner bracket for use in a sectional shelf including four struts and a plurality of shelf boards fixed and arranged vertically on the four struts at specified intervals, the corner bracket mountable at each joint portion of the strut and the shelf board comprising a side face; a common engaging portion through which coupling means is inserted to fix the corresponding strut and shelf board; a board engaging portion for engaging the corner bracket with the corresponding shelf board, the common engaging portion and the engaging portion being spaced horizontally at an upper portion of the corner bracket; and a strut engaging portion located below the common engaging portion and adapted for engaging the corner bracket with the corresponding strut; the side face extending outside a line connecting the board engaging portion with the strut engaging portion.

This corner bracket is constructed such that the side face thereof extends outside the clamping line connecting between the board engaging portion and the strut engaging portion. Since the side face exists along the clamping line in a state where this corner bracket is disposed at the joint portion of the strut and the shelf board, the corner bracket is unlikely to be bendingly deformed. (Contrary to this, since no member exists along the clamping line in the existing corner bracket, the stress concentrates on the vicinity of the common insertion hole and therefore the existing corner bracket is liable to be bendingly deformed.)

Accordingly, this corner bracket has sufficient rigidity, and is advantageous in that it can strongly hold the sectional shelf without exhibiting bending deformation, unlike existing ones.

Each strut of the sectional shelf includes a wide wall having a multitude of engaging holes arranged vertically, and each shelf board of the sectional shelf includes a side board having an insertion hole defined in a position corresponding to the common engaging portion of the corner bracket and having an engaging hole defined in a position corresponding to the board projected portion. The corner bracket for use with the above structured sectional shelf may advantageously include the board engaging portion consisting essentially of an engaging hole defined in the shelf board and a projecting body engageable with this engaging hole, and the strut engaging portion comprising the engaging hole defined in the side wall of the strut and a projecting body engageable with this engaging hole.

This corner bracket is mounted at the joint portion of the strut and the shelf board by engaging the respective projected portions with the engaging hole defined in side board of the shelf board and the engaging hole defined in the strut, and then inserting and fastening a coupling member such as a bolt through the common engaging portion of the corner bracket, the insertion hole of the shelf board and the engaging hole of the strut.

It may be advantageous to form a stepped portion projecting outward at a lower portion of the side face of the corner bracket and to form a contact edge of which the corresponding side board of the shelf board is supported at an upper edge of the stepped portion. With this arrangement, the lower portion of the side face of the corner bracket comes to contact with the inner surface of the corresponding side wall of the strut. The contact of the stepped portion with the inner surface of the side wall of the strut generates frictional resistance. The strut and the shelf board can be joined more strongly by this frictional resistance and the support given to the shelf board from the upper edge of the stepped portion effectively prevents the shelf board from shaking.

It may be also advantageous to form a stepped portion projecting inward at a lower portion of the side face of the corner bracket and to form a contact edge at an upper edge of the stepped portion on which the corresponding side board of the shelf board is supported. With this arrangement, the corner bracket can be held tightly between the strut and the shelf board, and shaking of the shelf board can be effectively suppressed since the side board of the shelf board is supported by this contact edge.

The corner bracket may be bent at a right angle along a vertical center line thereof laterally symmetrically. Thus formed corner bracket can be mounted on two faces of a corner portion of the sectional shelf by a single mounting operation. In addition, since the left and right side faces work to reinforce each other, the strut and the shelf board can be joined more strongly. Alternatively, the above corner bracket may be cut along the vertical center line and separated into two planer corner brackets. In this case, the shelf board can be joined with the strut with either of two planer corner brackets.

The strut engaging portion may comprise a projecting piece which is formed at a lower end of the side face and comes into contact with the lateral edge of the side wall of the strut.

This corner bracket is mounted at the joint portion of the strut and the shelf board by engaging the board projected portion with the engaging hole defined in the side board of the shelf board, bringing the end of the projecting piece into contact with the lateral edge of the side wall of the strut, and inserting and fastening a coupling member such as a bolt through the common engaging portion of the corner bracket, the insertion hole of the shelf board, and the engaging hole of the strut.

In the case where the corner portion is bent at an obtuse angle, the opposite side faces are subjected to such a force as to push them inward making the obtuse angle of the corner portion a right angle in the state where this corner bracket is mounted at the joint portion of the shelf board and the strut. As a result, a restoring force for restoring the angle of the corner into the obtuse angle is generated and subjected to the side boards of the shelf board. This makes the frictional force between the corner bracket and the side boards of the shelf board greater, thereby increasing the coupling force.

The projecting piece of the corner bracket may be formed by shaping a downward extending portion of each side face into a laterally long semi-cylindrical figure or semi-conic figure projecting outward. Thus formed projecting piece exhibits improved rigidity and is capable of resisting against a force subjected to an end thereof which is brought into contact with the lateral edge of the strut. Therefore, the lateral shaking of the shelf board can be reliably and strongly prevented by bringing the ends of the projecting pieces into contact with the opposite lateral edges of the strut.

The projecting piece may be formed by bending outward a downward extending portion of each side face whose lateral length is more than half the lateral length of the side face. Thus formed projecting piece exhibits the same improved rigidity as the above one.

The projecting piece may be a cylindrical form projecting outward from the side face of the corner bracket. Thus formed projecting piece is exceedingly sturdy.

The corner bracket may further include a ridge portion projecting outward or inward and formed at the corner portion. Thus formed ridge portion is fittable in a clearance defined between the side boards at the corner of the shelf board and an outer edge thereof comes into contact with the inner corner portion of the strut when the corner bracket is assembled into the sectional shelf. Accordingly, the provision of the ridge portion effectively prevents the lateral shaking of the shelf board.

The corner bracket may advantageously include a ridge portion projecting outward and formed at the corner portion and a recessed portion caved inward and formed at a center of the ridge portion. With the recessed portion, a stepped portion projecting inward is formed at an inner corner portion of the corner bracket, thereby deforming this corner portion. When the mount bolt is fastened with nuts in assembling the shelf, the edge of the nut 16 or head of the bolt comes into contact with this stepped portion. Thereby, the shelf board can be strongly joined with the strut.

The corner bracket may preferably include an upper projecting piece projecting outward and formed at an upper portion of each side face. Since this upper projecting piece is in contact with an upper inner surface of the side board of the shelf board, the corner bracket is open obliquely upward relative to the strut and the side boards of the shelf board. When the coupling member such as a mount bolt is fastened in this state, the upper projecting pieces are pressed against the inner surfaces of the side boards of the shelf board strongly. As a result, the sectional shelf is strongly assembled.

The corner bracket may desirably include a reinforcing projected portion projecting inward and extending laterally from the corner portion to the left and right side faces. With this arrangement, the corner bracket is reinforced against a force to bend the corner bracket around the corner portion. Thus, this corner bracket is not subject to deformation caused by an external force.

The corner bracket may advantageously include a projecting piece projecting inward and/or outward which is engageable with the insertion hole defined in the corresponding side board of the shelf board. With this arrangement, a coupling member such as a bolt at that portion can be dispensed with by engaging the projecting piece with the insertion hole of the shelf board and the engaging hole of the strut through which the coupling member is normally inserted to join the shelf board and the strut.

These and other objects, features and advantages of the present invention will become more apparent upon a reading of the following detailed description and accompanying drawings.

DETAILED DESCRIPTION OF PREFERRED EMBODIMENTS OF THE INVENTION

Figure 1:
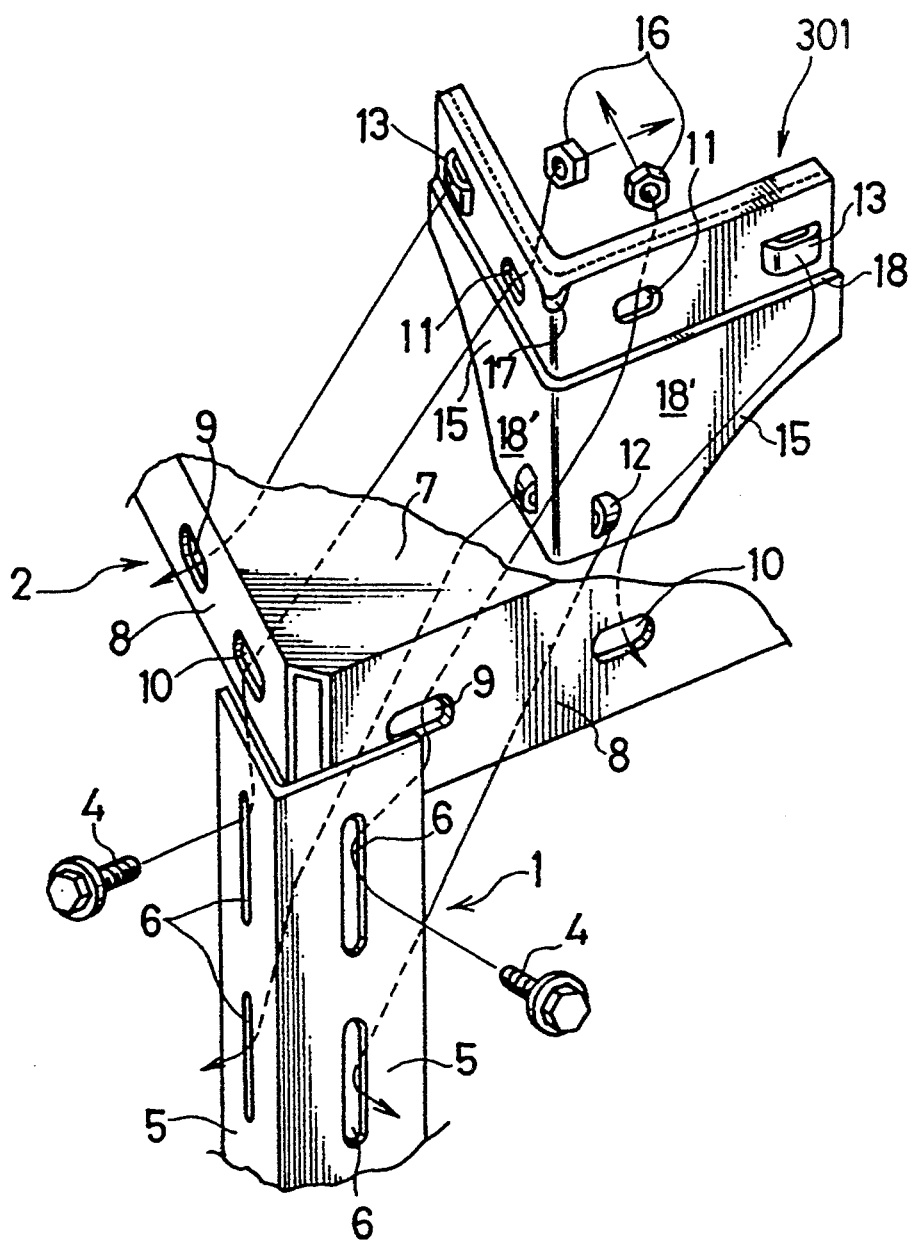
FIG. 1 is an exploded perspective view showing essential portions of a sectional shelf which is assembled with a first corner bracket embodying the invention.
Figure 2:
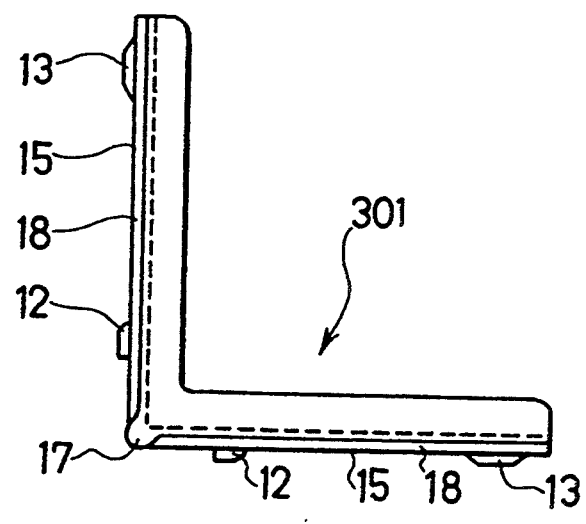
FIG. 2 is a plan view showing the first corner bracket.
Figure 3:
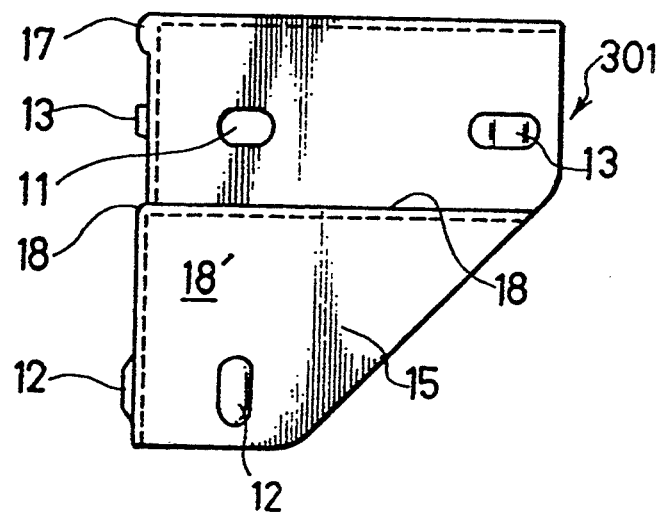
FIG. 3 is a side view showing the first corner bracket.

FIGS. 1 to 3 show a corner bracket for use in a sectional shelf as a first embodiment of the invention. FIG. 1 is an exploded perspective view showing a corner portion of the sectional shelf assembled with the first corner bracket; FIG. 2 is a plan view showing the first corner bracket; and FIG. 3 is a side view showing the first corner bracket.

The section shelf to which the first corner bracket 301 according to the invention is applied includes four struts 1 provided upright at four corners of the shelf, a shelf board 2 detachably mounted on these struts 1, the corner brackets 301 for reinforcing joint portions between the struts 1 and the shelf board 2, and mount bolts 4 serving as coupling members.

Each strut 1 is made of an angle member having an L-shaped cross-section, the angle member having a pair of side walls 5 extending in mutually perpendicular directions. In each side wall 5 are defined oblong engaging holes 6 extending in a vertical direction at specified intervals along a lengthwise direction of the side wall 5.

The shelf board 2 includes a top board 7 and side boards 8 projecting downward from the periphery of the top board 7 and having a specified width. At opposite side ends of each side board 8 is defined an oblong insertion hole 9 through which the mount bolt 4 is inserted. The hole 9 extends in a horizontal direction. Beside the insertion hole 9 is defined an oblong engaging hole 10 extending in the horizontal direction.

The corner bracket 301 is made of a pair of plate members each in a substantially triangular form and having a round hole which serves as a common insertion hole 11 for the mount bolt 4 at an upper corner portion. The two plate members are jointed laterally symmetrically and at right angles with each other. At a lower end of the corner bracket 301 are formed strut projected portions 12 each having an arcuate cross-section, the strut projected portions 12 projecting outward and engageable with the corresponding strut 1. The strut projected portion 12 is sized in the lateral direction so as to be fitted in the engaging hole 6 of the corresponding strut 1 while opposite end faces of the strut projected portion 12 are in contact with the opposite side edges of the engaging hole 6 when the corner bracket 301 is assembled into the sectional shelf.

A line connecting the common insertion hole 11, the strut projected portion 12, and a board projected portion 13 formed on one side face of the corner bracket 301 forms a triangle. The board projected portion 13 is engageable with the shelf board 2. The corner bracket 301 is formed such that each side face thereof extends outward of a portion corresponding to a hypotenuse of this triangle.

At opposite leading ends of the corner bracket 301 are formed the board projected portions 13 each having an arcuate cross-section, the board projected portions 13 projecting outward when viewed from above. It will be noted that "leading" refers to a side laterally apart from a corner portion of the corner bracket while "base" refers to a side near the corner portion thereof throughout the specification. The board projected portion 13 is sized in the vertical direction so as to be fitted in the engaging hole 10 of the shelf board 2 while upper and lower end faces of the board projected portion 13 are in contact with the upper and lower edges of the engaging holes 10 when eh corner bracket 301 is assembled into the sectional shelf. At a lower portion of the corner bracket 301 is formed a stepped portion 15 entirely projecting outward so as to have a contact edge 18 which comes to contact with lower ends of the side boards 8 of the shelf board 2 in assembling the shelf as will be described later. On the outer surface of the stepped portion 15 is formed a contact face 18' which comes into contact with the inner surface of the side wall 5 of the strut 1.

A projecting piece 17 is formed at an upper end corner portion of the plate members constituting the corner bracket 301, which comes into contact with an intersection of the inner surfaces of the side walls 5 of the strut 1 when the shelf is assembled. An upper edge portion of the corner bracket 301 is bent inward at a right angle so as to increase an area of the corner bracket 301 to be in contact with the lower surface of the top board 7 of the shelf board 2. However, the invention is not particularly limited to the corner brackets whose upper edge portion is bent inward at a right angle. Normally, the corner bracket 301 may not be necessarily formed such that the upper edge portion thereof comes to contact with the lower surface of the top board 7 of the shelf board 2.

The aforementioned members are assembled into the sectional shelf as follows. The inner surfaces of the side walls 5 of the struts 1 are brought into contact with the side boards 8 at the corner portions of the shelf board 2, and the corner brackets 301 are arranged at inner corner portions defined between the respective side boards 8. In this state, the board projected portions 13 are fitted in the engaging holes 10 of the side boards 8 while the strut projected portions 12 are fitted in the engaging holes 6 in the side walls 5. Thereafter, the mount bolts 4 are inserted through the engaging holes 6 located right above those engaging with the strut projected portions 12, and the contact edges 18 of the stepped portions 15 of the corner brackets 301 are brought into contact with the lower ends of the side boards 8 of the shelf board 2 to thereby position the shelf board 2 and the struts 1 relative to each other. In this state, nuts 16 are spirally fitted from ends of the mount bolts 4. As a result, the shelf board 2 is mounted on the struts 1 in such a state as to be reinforced with the corner brackets 301 while the side walls 5 of the struts 1 and the side boards 8 of the shelf board 2 are integrally joined with each other.

In the assembled sectional shelf, the surfaces of the stepped portions 15 of the corner brackets 301 are in contact with the inner surfaces of the side walls 5 of the struts 1, and the contact edges 18 at the upper end of the stepped portions 15 support the lower ends of the side boards 8 of the shelf board 2. In addition, the upper edges of the corner brackets 301 are in contact with the lower surface of the top board 7 of the shelf board 2, and the projecting pieces 17 provided at the upper ends of the corner portions of the corner brackets 301 defined by the two plate members are in contact with corner inner portions defined by the side walls 5 of the respective struts 1. It is important to bring the upper edges of the corner brackets 301 into contact with the lower surface of the top board 7 of the shelf board 2. This is because the shelf board 2 and the corner brackets 301 can be joined with each other more reliably, thereby effectively preventing undesirable horizontal movement of the shelf board 2.

Normally, the lower ends of the side boards 8 of the shelf board 2 are turned up inside. Accordingly, the thickness of the lower ends of the side boards 8 is twice as large as that of other portions thereof. Thus, when the corner bracket 301 is joined with the use of the bolts 4, the upper portions thereof rotate toward the struts 1 about the thick lower ends. As a result, the strut projected portions 12 come to contact with the outer edges of the corresponding engaging holes 6 of the struts 1, thus being reliably stopped by the engaging holes 6.

Further, an angle defined between the side faces of the corner brackets 301 is normally a right angle, but may be an obtuse angle. When the corner brackets 301 are joined with the use of the bolt 4, the side faces thereof are bent more inward so that the angle defined therebetween becomes a right angle. As a result, the board projected portions 13 come to contact with the edges of the engaging holes 10, thereby joining the corner brackets 301 and the shelf board 2 more reliably.

Figure 4:
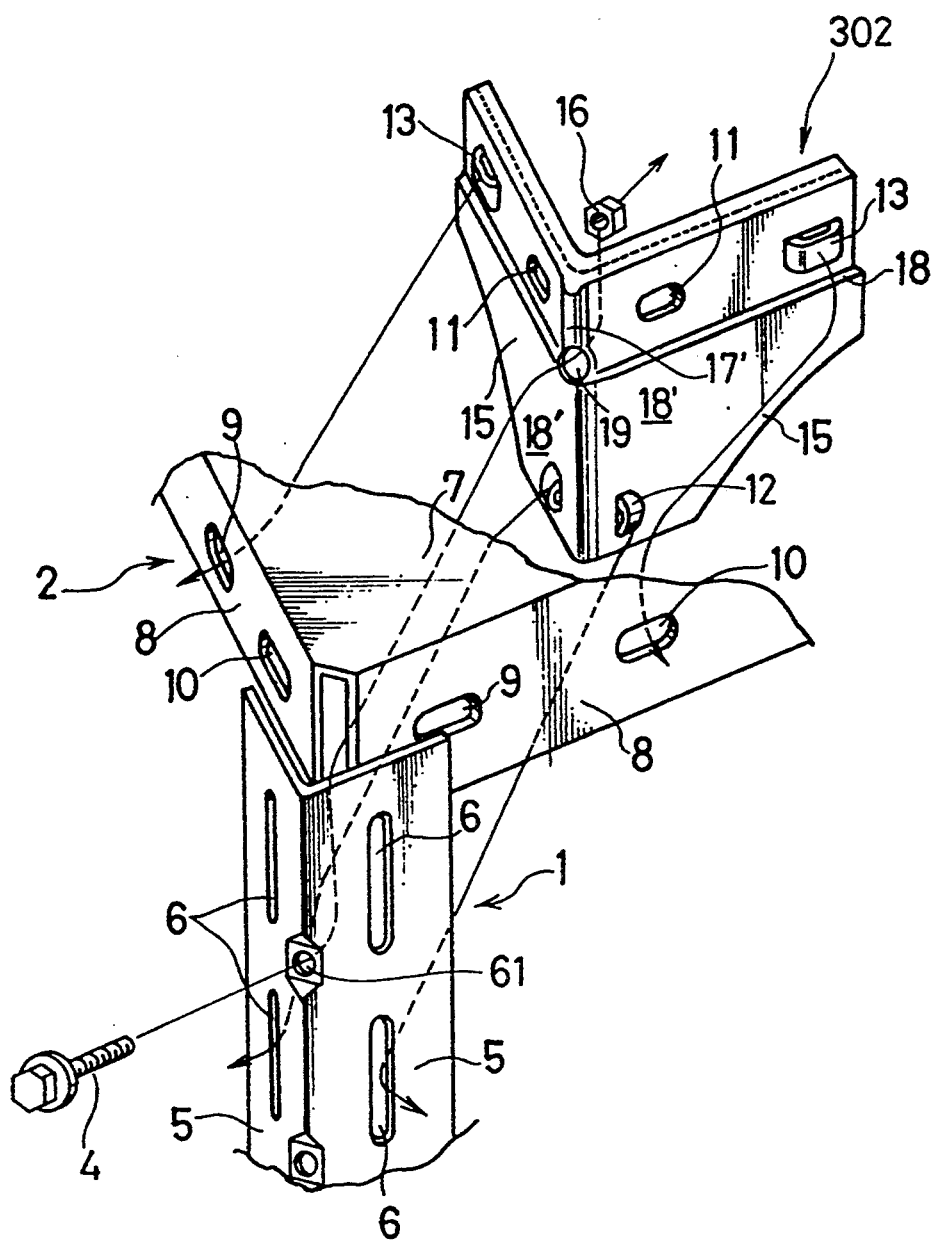
FIG. 4 is an exploded perspective view showing essential portions of a sectional shelf which is assembled with a second corner bracket embodying the invention.

FIG. 4 is an exploded perspective view showing a corner portion of a sectional shelf which is assembled with a second corner bracket embodying the invention. In this embodiment, the form of the corner bracket 302 is basically similar to the first corner bracket 301 shown in FIGS. 1 to 3. On the second corner bracket 302 is formed a ridge portion 17' which extends vertically from an upper end of the bracket 302 up to a contact edge 18 of a stepped portion 15. At a lower end portion of the ridge portion 17' is defined a hole 19 through which a bolt is inserted.

On the other hand, an engaging hole 61 is defined at a corner position of a strut 1 corresponding to the hole 19 of the corner bracket 302. The other constructions of the strut 1, shelf board 2, and corner bracket 302 are identical to those of the first embodiment shown in FIGS. 1 to 3.

Since the second corner bracket 302 and the strut 1 are constructed as described above, the shelf is assembled in the following manner. The inner surfaces of side walls of the struts 1 are brought into contact with side boards 8 at the corner portions of the shelf board 2, and the corner bracket 302 is disposed at the inner corner portion of the side boards 8. Then, board projected portions 13 of the corner brackets 302 are fitted in engaging holes 10 defined at the side boards 8, and strut projected portions 12 of the corner brackets 302 are fitted in engaging holes 6 defined in the side walls 5.

Thus far, the assembling way is identical to the one of the first embodiment.

Thereafter, mount bolts 4 are inserted through the engaging holes 61 defined at the corner portions of the struts 1, clearances at the corner portions of the shelf board 2, and the holes 19 defined at the corner portions of the corner brackets 302. The contact edges 18 of the stepped portions 15 of the corner brackets 302 are brought into contact with the side boards 8 of the shelf board 2 so as to be positioned. Further, nuts 16 are spirally fitted from the ends of the mount bolts 4 and joined in a state where the shelf board 2 and the struts 1 are positioned properly. In this way, the side walls 5 of the struts 1 are joined integrally with the side boards 8 of the shelf board 2 while being reinforced by the corner brackets 302, and thereby the shelf board 2 is mounted on the struts 1.

In the assembled sectional shelf, the surface of the stepped portions 15 of the corner brackets 302 are in contact with the inner surfaces of the side walls 5 of the struts 1, and the contact edges 18 of the stepped portions 15 support the lower ends of the side boards 8 of the shelf board 2. In addition, the upper ends of the corner brackets 302 are in contact with the lower surface of a top board 7 of the shelf board 2, and the vertical ridge portions 17' of the corner brackets 302 project outward through the clearances at the corner portions of the shelf board 2 and are in contact with the bent portions (corner portions) defined by the inner surfaces of the side walls of the struts 1. Accordingly, the lateral shaking of the shelf board 2 can be prevented effectively.

In addition, the insertion hole 19 is defined at the corner portion of the corner bracket 302 and the engaging hole 61 is defined at the corner portion of the shelf board 2 in correspondence with the hole 19. A single mount bolt 4 is inserted through these holes 19, 61 to thereby join the shelf board 2 with the strut 1. Thus, only one mount bolt 4 is necessary for each corner and the assembling operation is conveniently simplified.

In the case where tighter coupling is desired, the shelf board 2 may be joined with the struts 1 by inserting the mount bolts 4 through the engaging holes 6 defined in the side walls 5 of the struts 1, the insertion holes 9 defined in the side boards 8 of the shelf board 2, and the common insertion holes 11 defined in the side faces of the corner brackets 302 similar to the first embodiment, in addition to the coupling of the corner portions with the use of the mount bolts 4.

Figure 5:
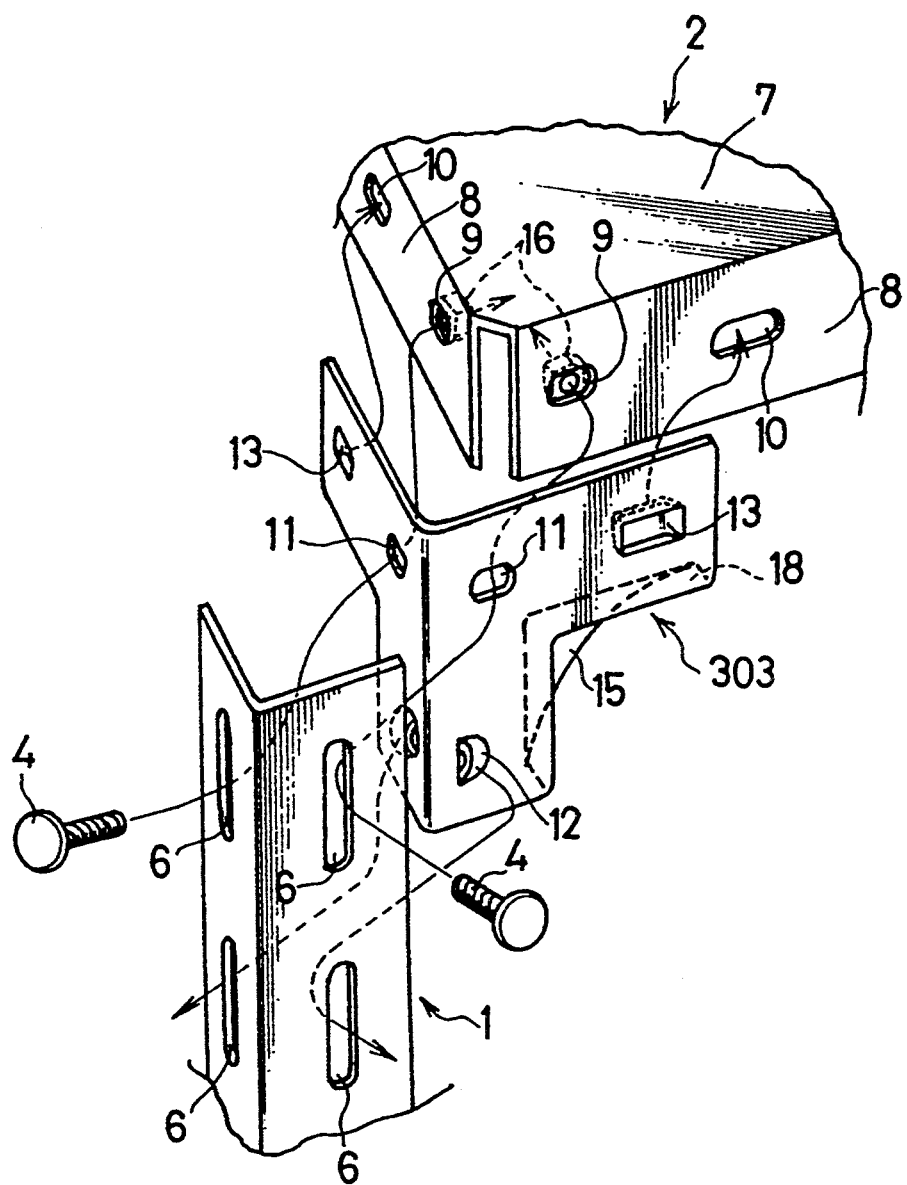
FIG. 5 is an exploded perspective view showing essential portions of a sectional shelf which is assembled with a third corner bracket embodying the invention.
Figure 6:
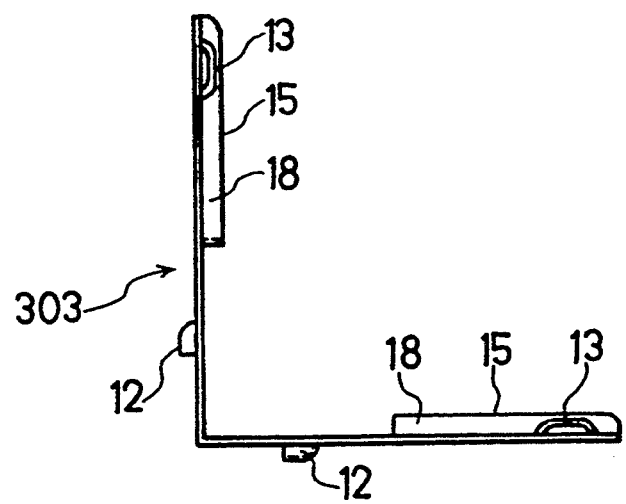
FIG. 6 is a plan view showing the third corner bracket.
Figure 7:
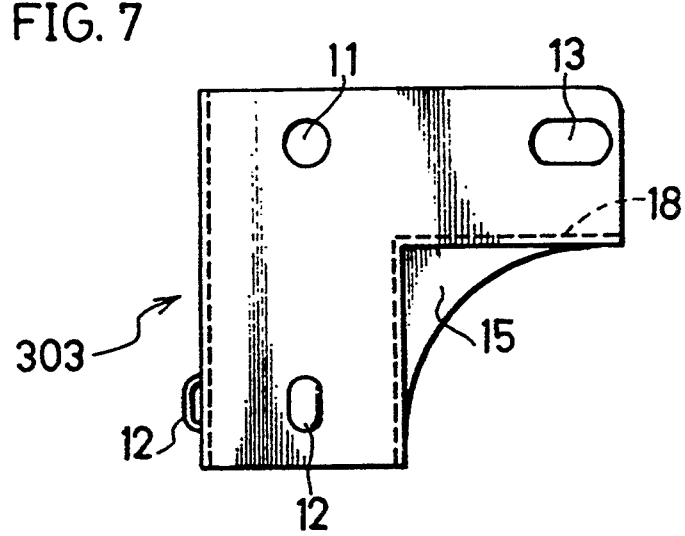
FIG. 7 is a side view showing the third corner bracket.

FIGS. 5 to 7 show a third corner bracket embodying the invention which is for use in a sectional shelf. FIG. 5 is an exploded perspective view of a corner portion of the sectional shelf according to the third embodiment; FIG. 6 is plan view showing the third corner bracket; and FIG. 7 is a side view showing the third corner bracket.

In the third embodiment, a strut 1 and a shelf board 2 are identical in construction to those of the first embodiment shown in FIGS. 1 to 3. Since a corner bracket 303 is disposed between the strut 1 and the shelf board 2, the construction of the third corner bracket 303 is different from the one of the first embodiment in this respect.

More specifically, the corner bracket 303 is made of a laterally symmetrical plate member half of which is L-shaped and has a round hole serving as a common insertion hole 11 for a mount bolt 4 at an upper end corner portion. The plate member is bent at a center portion thereof laterally symmetrically at a right angle.

At a lower end of the corner bracket 303 are formed strut projected portions 12 each having an arcuate cross-section. The strut projected portions 12 projecting outward and are engageable with the corresponding strut 1. The strut projected portion 12 is sized in the lateral direction so as to be fitted in an engaging hole 6 of the corresponding strut 1 when the corner bracket 303 is mounted on the struts 1 as will be described below.

At opposite leading end portions of the corner bracket 303 are formed board projected portions 13 each having an arcuate cross-section. The board projected portions 13 project inward when viewed from above. The board projected portion 13 is sized in the vertical direction so as to be fitted in an engaging hole 10 of the shelf board 2 when the corner bracket 303 is mounted on the shelf board 2. At a lower portion of the corner bracket 303 is formed a stepped portion 15 having a substantially triangular form and projecting inward so as to form a contact edge 18 which comes to contact with lower ends of side boards 8 of the shelf board 2 when the shelf is assembled.

Accordingly, in the third embodiment, the contact edges 18 of the stepped portions 15 of the corner bracket 303 are in contact with the lower ends of the side boards 8 of the shelf board 2 to thereby support the same from below in a state where the shelf is assembled.

The corner bracket 303 is formed such that the side face thereof, the common insertion holes 11, the strut projected portions 12, and the board projected portions 13 formed thereat are symmetrical with respect to the vertically extending center line thereof in the first to third embodiments. Thus, unlike the existing corner brackets, the corner bracket according to the invention can be applied to any corner portion without discriminating whether it is for a right or left corner portion.

Figure 8:
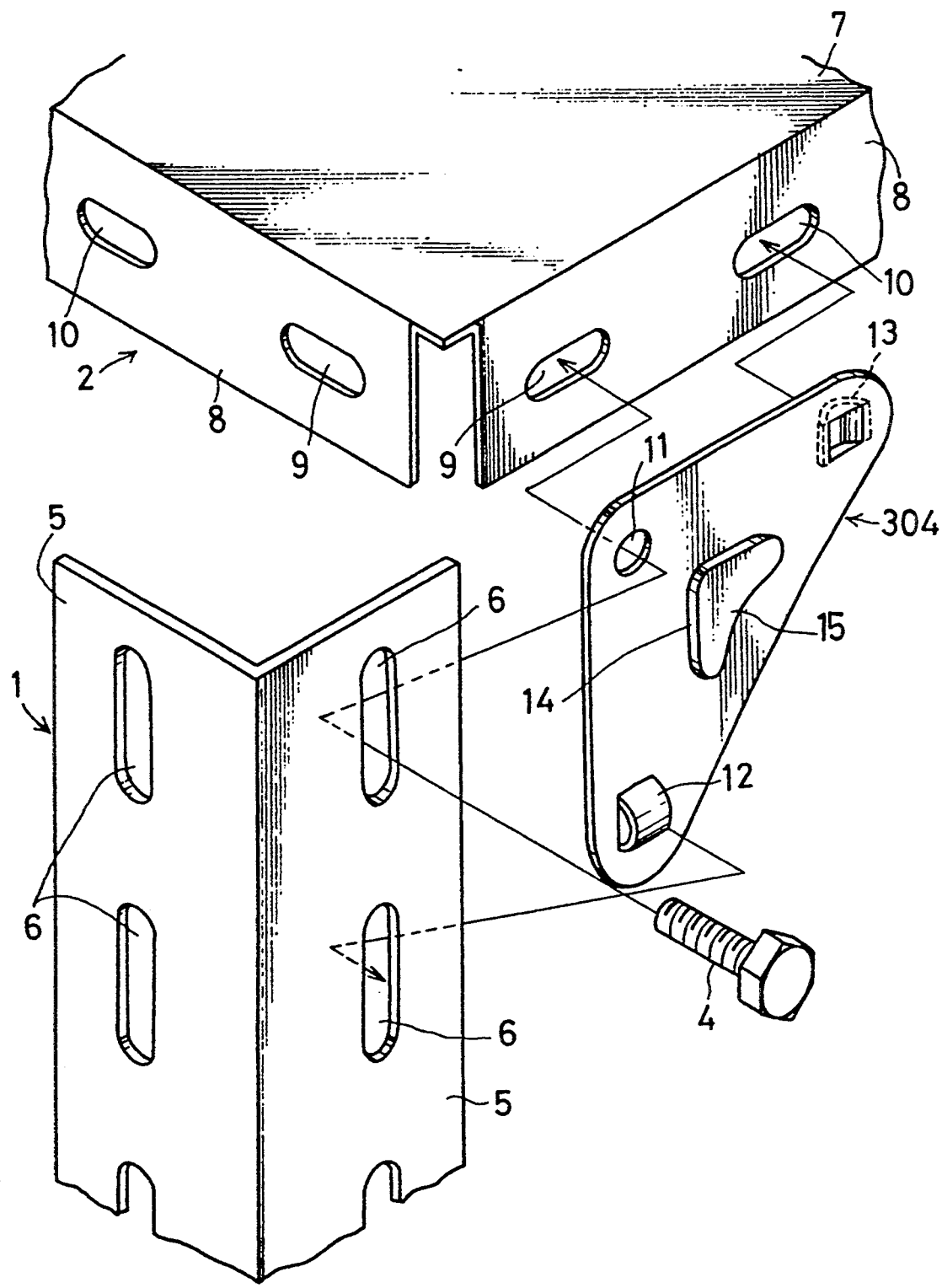
FIG. 8 is an exploded perspective view showing essential portions of a sectional shelf which is assembled with a fourth corner bracket embodying the invention.
Figure 9:
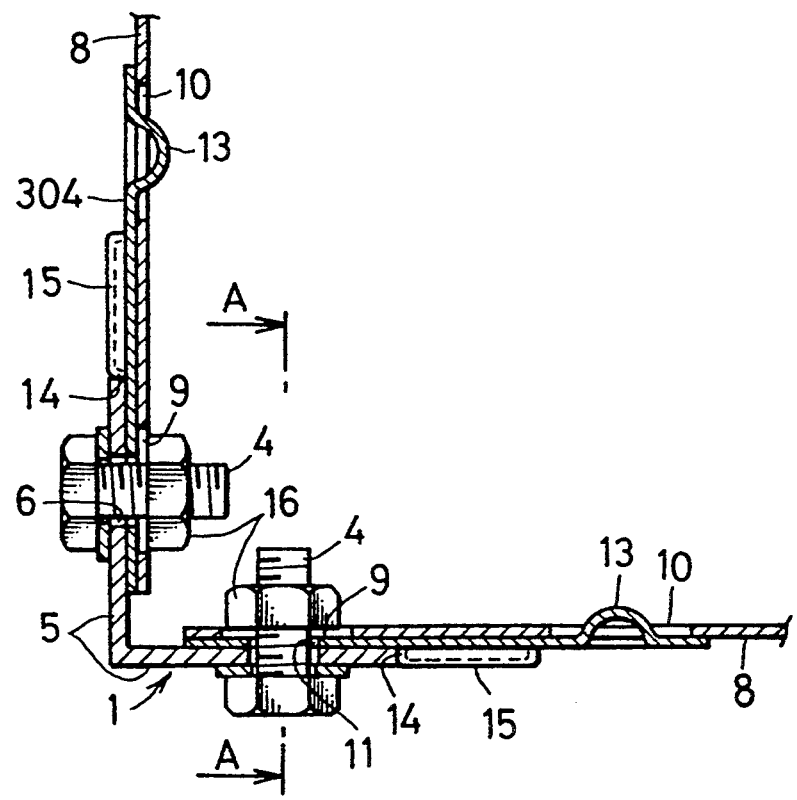
FIG. 9 is a horizontal sectional view showing an assembled state of the sectional shelf.
Figure 10:
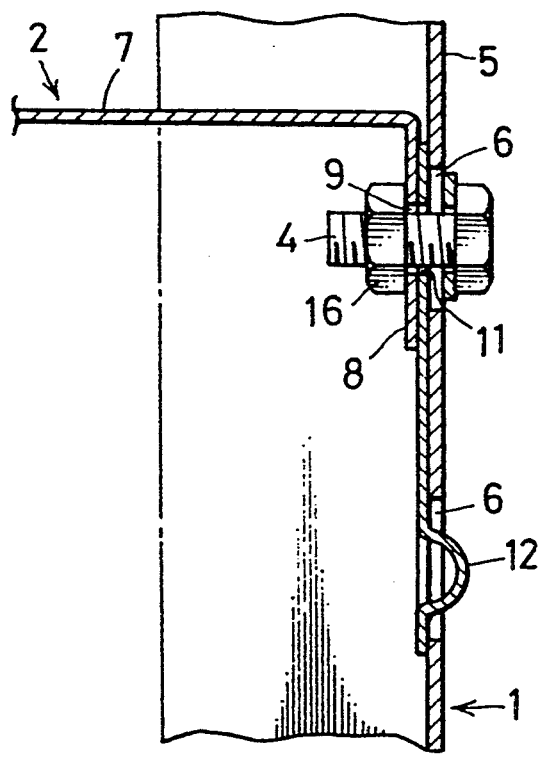
FIG. 10 is a sectional view taken along the line A—A in FIG. 9.
Figure 11:
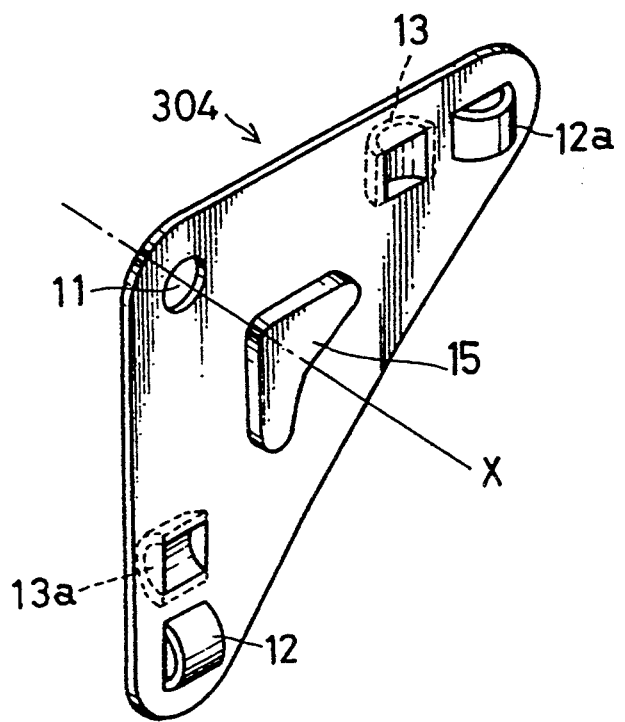
FIG. 11 is a perspective view showing a modification of the fourth corner bracket.
Figure 12:
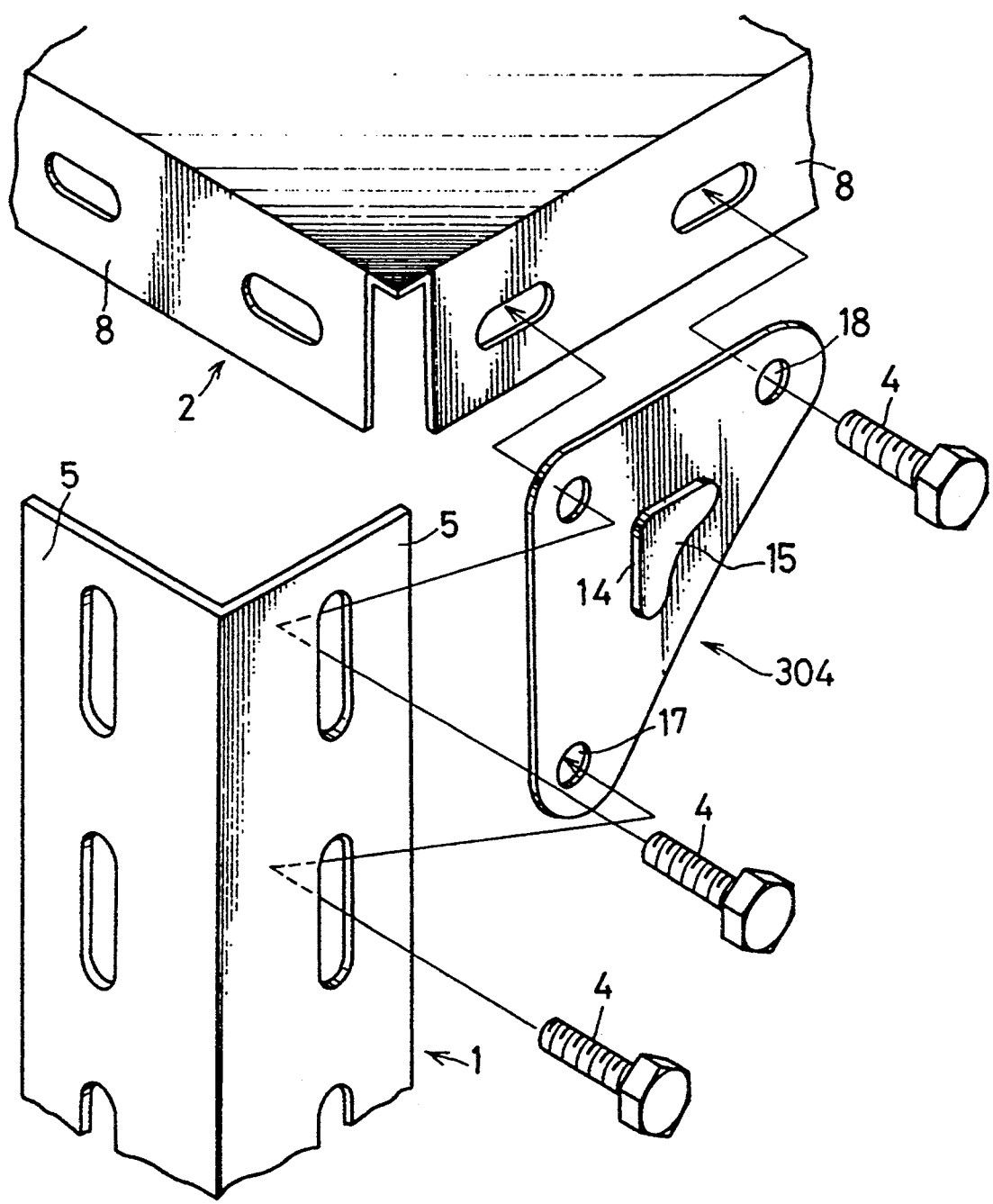
FIG. 12 is a perspective view showing another modification of the fourth corner bracket.

FIGS. 8 to 12 show a fourth corner bracket embodying the invention which is for use in a sectional shelf. FIG. 8 is an exploded perspective view showing a corner portion of the sectional shelf according to the fourth embodiments. FIG. 9 is a plan view in section showing a state where the sectional shelf is assembled. FIG. 10 is a sectional view taken along the line A—A in FIG. 9 and FIG. 12 is a perspective view showing a modification of the fourth corner bracket.

In this embodiment as well, a strut 1 and a shelf board 2 are identical in construction to those of the first embodiment. A pair of corner brackets 304 mounted at one corner of the sectional shelf consists of two separate and laterally symmetrical plate members each in a substantially triangular form.

This sectional shelf includes four struts 1 provided upright at four corners of the shelf, a shelf board 2 detachably mounted on these struts 1, corner brackets 304 for reinforcing joint portions between the struts 1 and the shelf board 2, and mount bolts 4 serving as coupling members.

Each strut 1 is made of an angle member having an L-shaped cross-section. The angle member has a pair of side walls 5 extending in mutually perpendicular directions. In each side wall 5 are defined oblong engaging holes 6 extending in a vertical direction at specified intervals along a lengthwise direction of the side wall 5.

The shelf board 2 includes a top board 7 and side boards 8 projecting downward from the periphery of the top board 7 and having a specified width. At opposite side ends of each side board 8 is defined an oblong insertion hole 9 through which the mount bolt 4 is inserted. The oblong insertion hole 9 extends in a horizontal direction. An oblong engaging hole 10 extending in the horizontal direction is defined beside the insertion hole 9.

The corner bracket 304 is made of a substantially triangular plate member having a round hole which serves as a common insertion hole 11 for the mount bolt 4 at an upper end corner portion. At a lower end of the corner bracket 304 is formed a strut projected portion 12 having an arcuate cross-section. The strut projected portion 12 projects outward and is engageable with the corresponding strut 1. The strut projected portion 12 is sized in the lateral direction so as to be fitted in the engaging hole 6 of the corresponding strut 1 when the corner bracket 304 is mounted on the strut 1.

A board projected portion 13 having an arcuate cross-section is formed at a leading end of the corner bracket 304. The board projected portion 13 projects inward when viewed from above. The board projected portion 13 is sized in the vertical direction so as to be fitted in the corresponding engaging hole 10 of the shelf board 2 when the corner bracket 304 is mounted on the shelf board 2. At a center portion of the corner bracket 304 is formed a substantially triangular stepped portion 15 projecting outward. The stepped portion 15 is formed with a contact face 14 which comes to contact with a lateral edge of the strut 1 when the sectional shelf is assembled.

The respective members are assembled into the sectional shelf as follows. The corner brackets 304 are disposed between the inner surfaces of the side walls 5 of the struts 1 and the outer surfaces of the side boards 8 of the shelf board 2. In this state, the board projected portions 13 are fitted in the engaging holes 10 of the side boards 8 while the strut projected portions 12 are fitted in the engaging holes 6 in the side walls 5. Thereafter, the mount bolts 4 are inserted through the engaging holes 6 located right above those engaging with the strut projected portions 12, the common insertion holes 11 of the corner brackets 304, and the insertion holes 9 of the shelf board 2. In addition, the contact faces 14 of the corner brackets 304 are brought into contact with the lateral edges of the struts 1 so as to position the corner brackets 304 properly. Further, the side walls 5 of the struts 1 and the side boards 8 of the shelf board 2 are integrally jointed with each other through the corner brackets 304 by fitting nuts 16 spirally from ends of the mount bolts 4 in a state where the shelf board 2 and the struts 1 are positioned relative to each other, to thereby mount the shelf board 2 on the struts 1. It is preferable that the upper edges of the corner brackets 304 are in contact with the lower surface of the top board 7 of the shelf 2 in a state where the corner brackets 304 are mounted between the shelf board 2 and the struts 1. However, the upper edges of the corner brackets may not necessarily be in contact with the lower surface of the top board 7.

The specific construction of the fourth corner bracket 304 is not limited to the above, and can be modified in various manners. For instance, the corner bracket 304 may be constructed symmetrical with respect to a center line X as shown in FIG. 11 by forming a board projected portion 13a above the strut projected portion 12 formed at the lower end of the corner bracket 304 and a strut projected portion 12a at the left of the board projected portion 13 formed at the leading end of the corner bracket 304. The board projected portion 13a projects inward and is engageable with the shelf board 2, and the strut projected portion 12a projects outward and is engageable with the strut 1. In this case, the corner brackets 304 having the same shape can be provided at respective corner portions of the shelf board 2.

Although unillustrated, the corner brackets 304 are not disposed between the struts 1 and the shelf board 2, but are disposed inward of the side boards 8 of the shelf board 2 similar to the first embodiment. In this case, the board projected portions 13 have to be formed projecting outward (i.e., the board projected portions 13 are provide at the outer faces of the corner brackets 304 similar to the strut projected portions 12), so as to be fitted in the engaging holes 10 of the side boards 8.

As described above, the corner bracket 304 according to the invention is formed such that each side face thereof extends outward of a portion corresponding to a hypotenuse of a triangle formed by a line connecting the common insertion hole 11, the strut projected portion 12, and the board projected portion 13 formed on the side face of the corner bracket 304. Accordingly, even if such a compressive force is applied as to cause the opposite ends of the hypotenuse to approach to each other, i.e. even if such a force is applied as to cause the shelf board to shake, the corner bracket 304 can resist sufficiently against the compressive force since the side face thereof exists at the portion around the hypotenuse. In other words, the corner bracket according to the invention can function as a clamp sufficiently and reliable, thereby effectively preventing undesirable horizontal movement of the shelf board 2.

Further, the stepped portion 15 is formed at the center portion of the corner bracket 304, and the corner bracket 304 is mounted in a state where the contact face 18' or contact edges 14, 18 formed at the stepped portion 15 is in contact with the inner surface or lateral edge of the side wall 5 of the strut 1 or the lower edge of the side board 8 of the shelf board 2. Accordingly, in the case where there is generated such a moment as to rotate the shelf board 2 and the corner bracket 304 about the position where the mount bolt 4 is inserted according to the weight of an article placed on the shelf board 2, this moment can be supported effectively by the stepped portion 15 and the strut projected portion 12.

Thus, there can be attained sufficient rigidity to support the above moment without coupling the joint portions tightly by the coupling member such as the mount bolt 4. Even if the above moment acts repeatedly, the joint portion of the corner bracket 304 and the strut 1 can be prevented reliably from shaking. Further, the provision of the stepped portion 15 improves the rigidity of the corner bracket 304 itself against the moment generated by the load, or the like. Therefore, even if a large load is applied to the corner bracket 304, the corner bracket 304 can be prevented effectively from deforming.

In the above embodiment, the side wall 5 of the strut 1, the upper end portion of the corner bracket 304, and the side board 8 of the shelf board 2 can be joined integrally with the use of the coupling member including a single mount bolt 4 in a state where the strut projected portion 12 and the board projected portion 13 formed on the side face of the corner bracket 304 are engaged with the engaging holes 6, 10 of the strut 1 and the shelf board 2. Accordingly, a time required to assemble the shelf can be shortened greatly while reinforcing the joint portion of the shelf board 2 and the strut 1 substantially at the same level.

More specifically, the load which acts in the case where an article is placed on the shelf board 2 can be supported distributively by the mount bolt 4, the strut projected portion 12, and the board projected portion 13. Thus, a coupling strength can be obtained which is substantially the same as one obtained where the corner bracket is mounted with the use of three mount bolts, despite the fact that the number of mount bolts 4 is reduced to one, and the shelf board 2, the strut 1, and the corner bracket 304 are joined with each other in a simple construction. However, these members may be joined with one another by making the common insertion hole 11 of the corner bracket 304 round, forming an internal thread at an edge defining the round hole 11, and fitting the mount bolt 4 spirally to the round hole except for the third embodiment shown in FIGS. 5 to 7. This arrangement reduces conveniently the number of members constituting the invention since the coupling with the mount bolt 4 can be made without the nut 16.

In the third embodiment shown in FIGS. 5 to 7, the coupling with the mount bolt 4 can be made similarly without the nut 16 if an internal thread is formed at an edge defining the insertion hole 9 of the shelf board 2.

Figure 13:
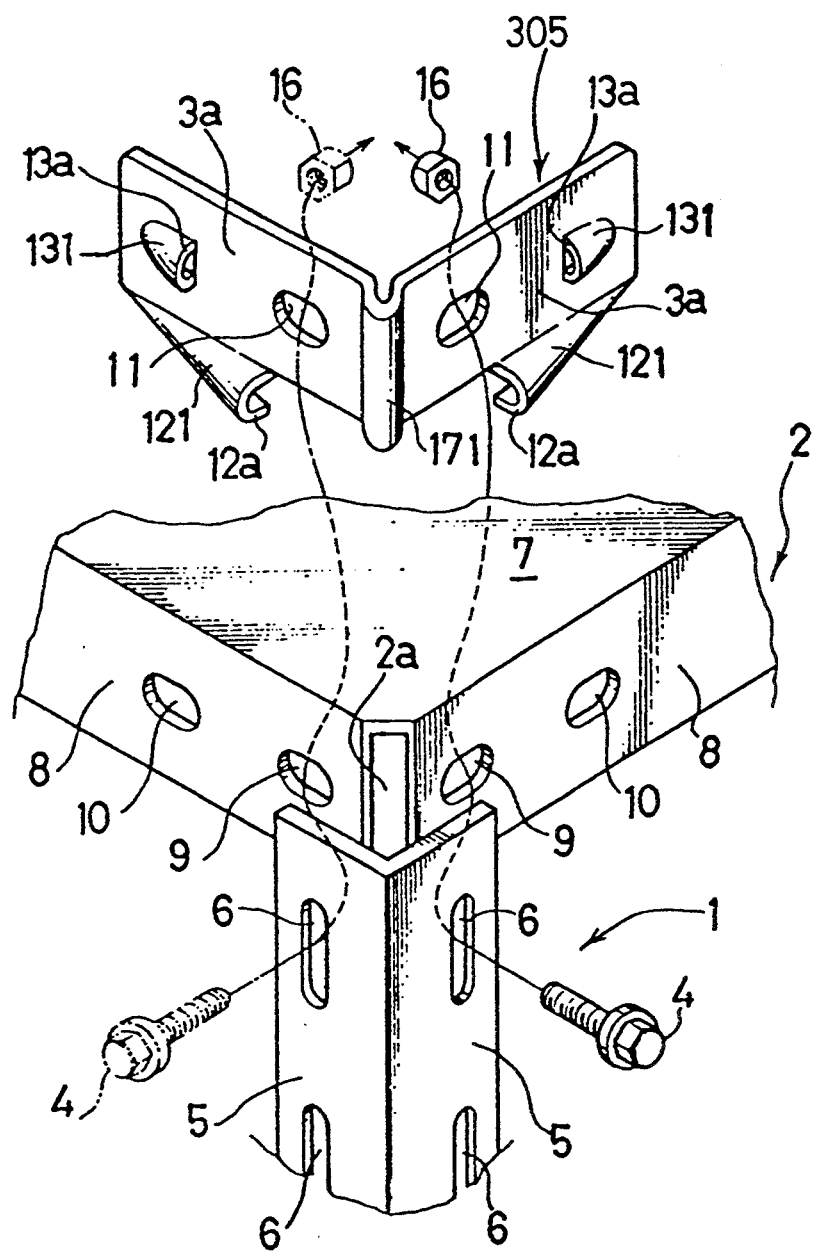
FIG. 13 is an exploded perspective view showing essential portions of a sectional shelf which is assembled with a fifth corner bracket embodying the invention.
Figure 14:
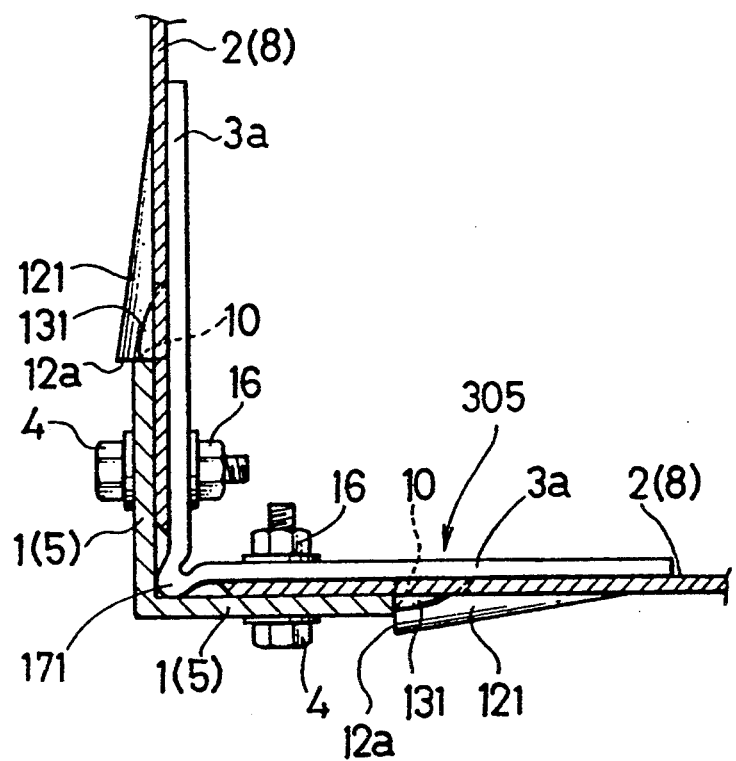
FIG. 14 is a plan view in section showing a corner portion of the sectional shelf in an assembled state where it is assembled with the fifth corner bracket.

FIG. 13 is an exploded perspective view showing a fifth corner bracket embodying the invention which is for use in a sectional shelf, and FIG. 14 is a plan view in section showing a corner portion of the sectional shelf in a state where the sectional shelf is assembled using the fifth corner bracket. Although two mount bolts 4 are illustrated in FIG. 13 one indicated by solid line and the other indicated by the phantom line, the number of mount bolts 4 is not limited to two. Three or more mount bolts 4 may be provided, or a single mount bolt 4 may be sufficient. However, since the fifth corner bracket 305 is excellent in its coupling force as will be described later, it may be normally sufficient to use the single mount bolt 4 as indicated by the solid line for its purpose.

The strut 1 is made of an angle member having an L-shaped cross-section. The angle member has a pair of side walls 5 extending in mutually perpendicular directions. In each side wall 5 are defined oblong engaging holes 6 extending in a vertical direction at specified intervals along a lengthwise direction of the side wall 5.

The shelf board 2 includes a top board 7 and side boards 8 projecting downward from the periphery of the top board 7 and having a specified width. At opposite side ends of each side board 8 is defined an oblong insertion hole 9 through which the mount bolt 4 is inserted. The hole 9 extends in a horizontal direction. An oblong engaging hole 10 extending in the horizontal direction is defined beside the insertion hole 9. A clearance 2a is formed between side boards 8 at each corner portion of the shelf board 2.

The corner bracket 305 is made of a pair of plate members each in a substantially rectangular form and having a round hole which serves as a common insertion hole 11 for the mount bolt 4 at an upper end corner portion. The two plate members are jointed laterally symmetrically at right angles with each other. At a lower end of each side face 3a of the corner bracket 305 is formed a projecting piece 121 which projects outward and is conic in form when viewed from the side.

A portion of a specified width extending from a lower leading end of the side face 3a of the corner bracket 305 is curled into a semi-conic form so as to provide the projecting piece 121 projecting outward. A vertex of the semi-cone is positioned at the leading end of the side face 3a, and a bottom portion of the semiconic provides an engaging side face 12a which is engageable with the side wall 5 of the strut 1. The engaging side face 12a is opposed to a corner portion of the corner bracket 305.

In this embodiment, an engaging side face 13a formed at a projected portion 131 is set so that an acute angle is defined between the side face 13a and the side face 3a of the corner bracket 305 as shown in FIG. 14. However, the angle defined between the side face 13a and the side face 3a is not particularly limited to an acute angle.

The projecting pieces 121 are sized such that oppositely located engaging side faces 12a come into contact with the lateral edges of the side walls 5 so as to hold the strut 1 tightly when the corner bracket 305 is mounted as will be described below.

At opposite leading ends of the corner bracket 305 are formed the projected portions 131 each having an arcuate cross-section. The projected portions 131 project outward when viewed from above. The projected portions 131 are sized in the vertical direction so as to be fitted in the engaging holes 10 of the shelf board 2 when the corner bracket 305 is mounted.

At the corner portion of the pair of plate members of the corner bracket 305 is formed a ridge portion 171 which projects outward through the clearance 2a of the shelf board 2 and comes to contact with the corner portion of the strut 1 in the state where the corner bracket 305 is assembled into the sectional shelf.

In this embodiment, the corner bracket 305 is sized such that the upper edge thereof comes to contact with the inner surface of the top board 7 of the shelf board 2 and the upper faces of the projecting pieces 121 come to contact with the lower edge of the corresponding side boards 8 of the shelf board 2. The feature that the upper edge of the corner bracket 305 comes to contact with the inner surface of the top board 7 is also shared by the other embodiments of the invention.

The aforementioned members are assembled into the sectional shelf as follows. The inner surfaces of the side walls 5 of the struts 1 are brought into contact with the side boards 8 at the corner portions of the shelf board 2, and the corner brackets 305 are arranged at inner corner portions defined by the respective side boards 8. The corner brackets 305 are positioned such that the projected portions 131 are fitted in the engaging holes 10 of the side boards 8 and that the opposite lateral edges of each strut 1 are held tightly between the engaging side faces 12a of the pair of projecting pieces 121.

Thereafter, the mount bolts 4 are inserted through the engaging holes 6 of the struts 1, the insertion holes 9 of the shelf board 2, and the insertion holes 11 of the corner brackets 305. In this state, the nuts 16 are spirally fitted onto ends of the mount bolts 4. As a result, the shelf board 2 is mounted on the struts 1 while being reinforced with the corner brackets 301, and the side walls of the struts 1 and the side boards 8 of the shelf board 2 are integrally joined with each other.

In the assembled sectional shelf, the engaging side faces 12a of the pair of projecting pieces 121 provided at each corner bracket 305 are in contact with the opposite lateral edges of the corresponding strut 1, and the upper faces of the projecting pieces 121 support the lower edges of the side boards 8 of the shelf board 2. Thus, the shelf board 2 and the corner brackets 305 can be integrated to each other more reliably, thereby effectively preventing undesirable horizontal shaking.

Each projecting piece 121 of the corner bracket 305 is formed by curling a downward extending portion of the side face 3a of the corner bracket 305 over a sufficiently long length into the semi-conic form. Accordingly, even if a sufficiently large force is applied to the engaging side faces 12a, the projecting pieces 121 resist sufficiently against such a force and are not deformed. Thus, the sectional shelf can be assembled more reliably.

In this embodiment, the angle defined between the engaging side face 13a of the projected portion 131 and the side face 3a of the corner bracket 305 is an acute angle. Thus, in the assembled shelf, the edges of the engaging holes 10 are located in acute angle portions between the engaging side faces 13a and the side face 3a as shown in FIG. 14, thereby making the coupling of the shelf more reliable.

Further in this embodiment, the corner bracket 305 is provided at the corner portion with the ridge portion 171 projecting outward. In the assembled shelf, this ridge portion 171 is located in the clearance 2a between the side boards 8 at the corner portion of the shelf board 2 and is in contact with the inner surface of the corner portion of the strut 1. This arrangement serves to improve the coupling effect of the corner bracket.

In this embodiment, since the corner bracket 305 is sized such that the upper edge thereof is in contact with the inner surface of the top board 7 of the shelf board 2 in the assembled shelf, undesirable horizontal shaking can be prevented effectively.

Incidentally, in assembling the sectional shelf, it is normally tested whether the shelf board 2 is orthogonal to the respective struts 1 using a suitable device. This testing requires careful attention and therefore substantial amounts of labor and time have been conventionally spent on it. In contrast, the corner bracket 305 according to the invention is sized such that the upper edge thereof comes to contact with the inner surface of the top board 7 of the shelf board 2. Thus, the struts 1 and the shelf board 2 are positioned orthogonal to each other merely by assembling the corner brackets 305 into the sectional shelf, thereby obviating conveniently the need for the orthogonal testing required by the prior art.

Although the angle defined between the left and right side faces 3a of the corner bracket 305 is a right angle in this embodiment, this angle may be an obtuse angle. With this arrangement, the left and right side faces 3a of the corner bracket 305 press the corresponding side boards 8 of the shelf 2 outward in the state where the corner bracket 305 is assembled into the sectional shelf. Accordingly, even if the coupling by the mount bolts 4 is loosened, the coupling of the shelf by the corner brackets 305 is not loosened.

Figure 15:
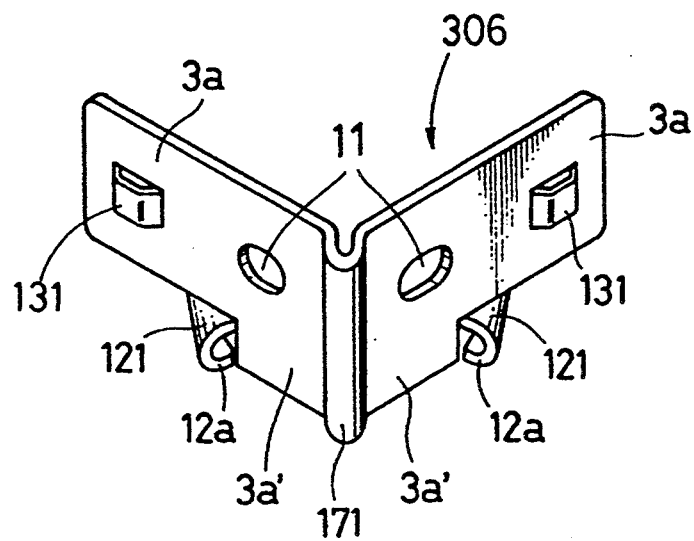
FIG. 15 is a perspective view showing a sixth corner bracket embodying the invention.
Figure 16:
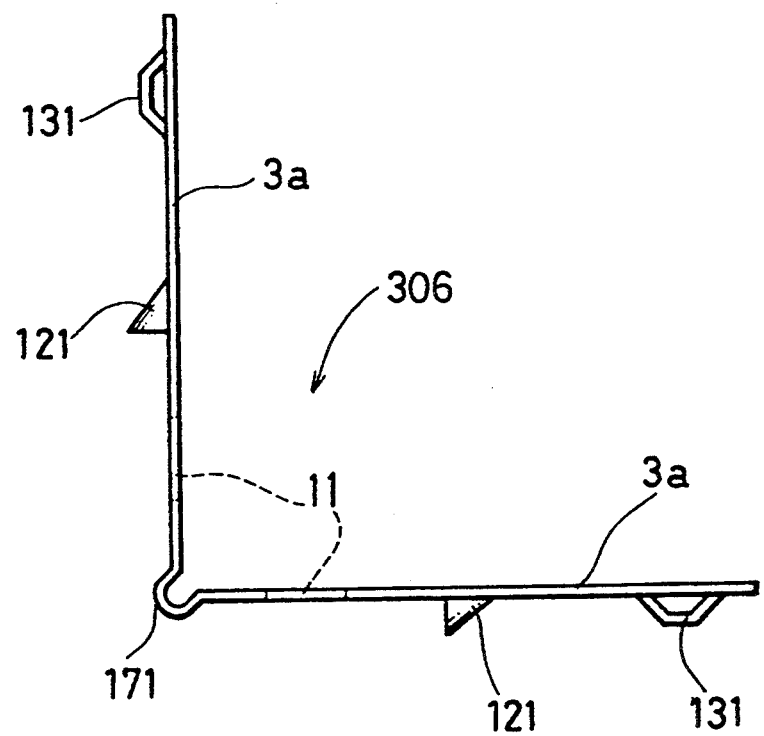
FIG. 16 is a plan view showing the sixth corner bracket.
Figure 17:
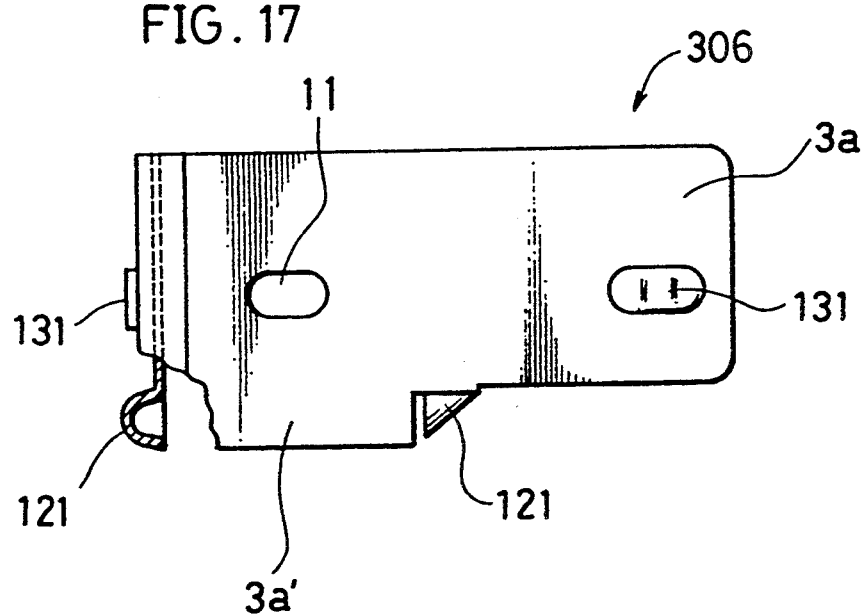
FIG. 17 is a side view partially cut away showing the sixth corner bracket.

FIG. 15 is a perspective view showing a sixth corner bracket embodying the invention, FIG. 16 is a plan view showing the sixth corner bracket, and FIG. 17 is a side view partly cut away showing the sixth corner bracket. In this embodiment, projecting pieces 121 provided at opposite lower leading ends of a corner bracket 306 are each formed by curling a lower end portion of a side face 3a into the semi-conic form projecting outward similar to the fifth embodiment as shown in these figures. However, the projecting pieces 121 of this embodiment is shorter than the one of the fifth embodiment in the horizontal length.

Instead, the side face 3a extends slightly downward at a corner portion to thereby form a reinforcing side face 3a'. The width of the side face 3a is increased by the reinforcing side face 3a', making the side face 3a stronger. Further, a ridge portion 171 is made longer to thereby increase an area where the ridge portion 171 is in contact with the inner surface of the strut 1 in the assembled shelf. This improves the coupling effect of the corner bracket further.

Figure 18:
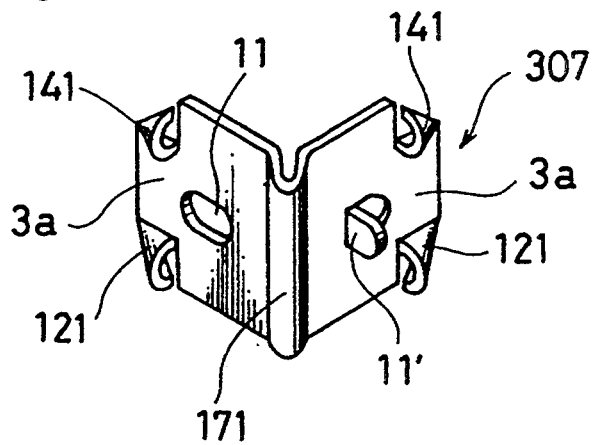
FIG. 18 is a perspective view showing a seventh corner bracket embodying the invention.
Figure 19:
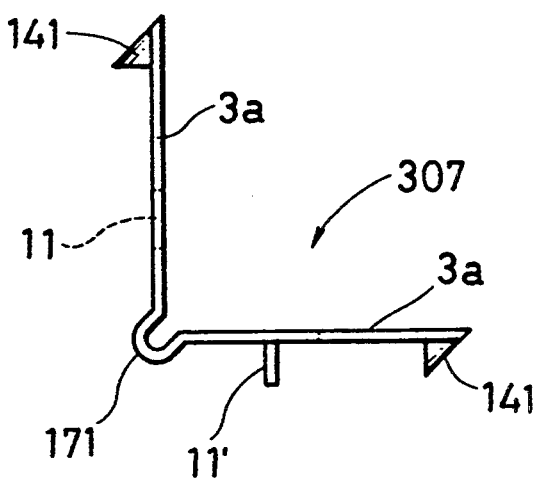
FIG. 19 is a plan view showing the seventh corner bracket.
Figure 20:
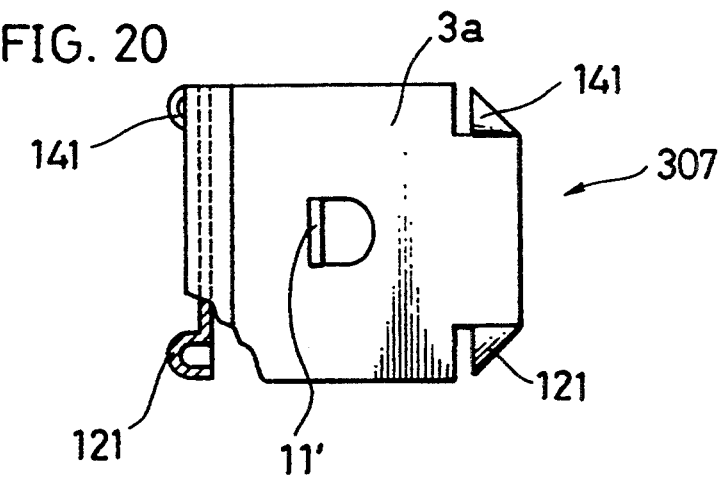
FIG. 20 is a side view partially cut away showing the seventh corner bracket.

FIG. 18 is a perspective view showing a seventh corner bracket embodying the invention, FIG. 19 is a plan view showing the seventh corner bracket, and FIG. 20 is a side view partly cut away showing the seventh corner bracket. As shown in these figures, a corner bracket 307 is of the so-called mini-type, having a side face 3a shorter than the side face 3a of the sixth embodiment in the horizontal length.

Unlike the fifth or sixth embodiment, one side face 3a of the seventh embodiment is not large enough to have both an insertion hole 11 and a projected portion 131 formed therein. Accordingly, an insertion hole 11 is formed in one side face 3a, whereas a cut-up piece 11' corresponding to the projected portion 131 is formed in the other side face 3a. The cut-up piece 11' is formed by cutting a center portion of the side face 3a semicircularly and by bending the cut portion outward normal to the plane of the side face 3a. It will be noted that a projecting piece 121 similar to the one of the sixth embodiment is formed at a lower leading end portion of the side face 3a.

Although the cut-up piece 11' shown in FIG. 18 is cut up in the horizontal direction, the piece 11' may be cut up in the vertical direction. Alternatively, a bar ring may be formed. Further, the piece 11' may be formed similar to the projected portion 131 in the fifth or sixth embodiment.

An area of the side face 3a in contact with the inner surface of the side boards 8 of the shelf board 2 in the assembled shelf is reduced as much as the side face 3a is reduced in size. Accordingly, the side face 307 is disadvantageous in assembling the sectional shelf firmly. In order to compensate for the reduced coupling effect, an upper projecting piece 141 is formed at an upper lateral end of the side face 3a. This upper projecting piece 141 is identical to the lower projecting piece 121, and is symmetrical with respect to a horizontal center line of the side face 3a.

The projecting pieces 121, 141 illustrated in FIGS. 18 to 20 are formed so as not to bulge out of the contour of the side face 3a. However, the projecting piece 121 may be formed so as to project downward from the lower end of the side face 3a and the upper projecting piece 141 may be formed so as to project upward from the upper end of the side face 3a.

The upper projecting pieces 141 of the corner bracket 307 are in contact with the upper inner surfaces of the side boards 8 of the shelf board 2 in the assembled shelf, and the corner bracket 307 is open to the strut 1 and the side boards 8 of the shelf board 2 obliquely upward. When the coupling member (mount bolt) is fastened in this state, the upper projecting pieces 141 press the inner surfaces of the side boards 8 of the shelf board 2 strongly. As a result, the sectional shelf is assembled further firmly, thereby compensating sufficiently for the reduced contact area caused by the smaller side faces 3a.

Figure 21:
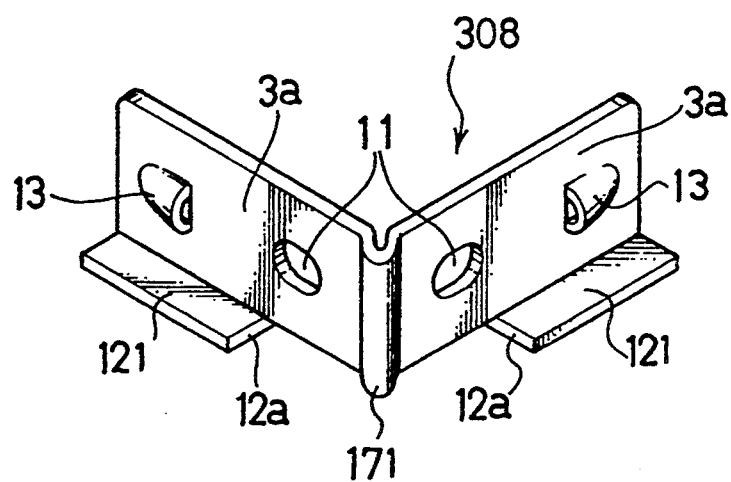
FIG. 21 is a perspective view showing an eighth corner bracket embodying the invention.

FIG. 21 is a perspective view showing an eighth corner bracket embodying the invention. As shown in this figure, a lower end portion of a side face 3a is bent to project horizontally outward to thereby form a projecting piece 121 in this embodiment. Since the length of the projecting piece 121 is set longer than the half the horizontal length of the side face 3a in this case, the projecting piece 121 is not to deform even if an engaging side face 12a thereof is pressed against a corresponding lateral edge of a side wall 5 of the strut 1 in the state where the shelf is assembled.

Figure 22:
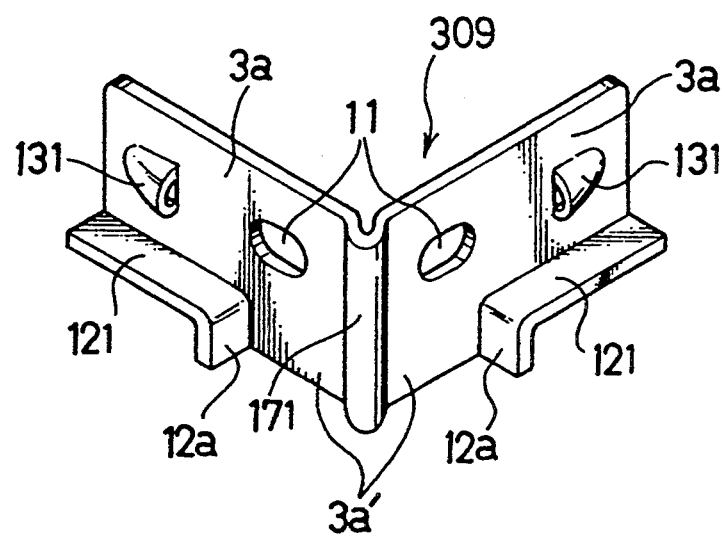
FIG. 22 is a perspective view showing a ninth corner bracket embodying the invention.

FIG. 22 is a perspective view showing a ninth corner bracket embodying the invention. In this embodiment, a side face 3a of a corner bracket 309 extends downward at a corner portion to thereby form a reinforcing side face 3a' similar to the sixth embodiment. At a lower leading end of the side face 3a is formed a projecting piece 121 similar to the one in the eighth embodiment. An end portion of the projecting piece 121 close to a corner portion of the corner bracket 309 is bent downward to thereby form a vertically extending engaging side face 12a. The engaging side face 12a is joined integrally with the reinforcing side face 3a'.

Since the corner bracket 309 has a large contact area with the lateral edge of the side wall 5 of the strut 1, because of the wide downward extending engaging side face 12a, the undesirable lateral shaking can be suppressed more reliably.

Figure 23:
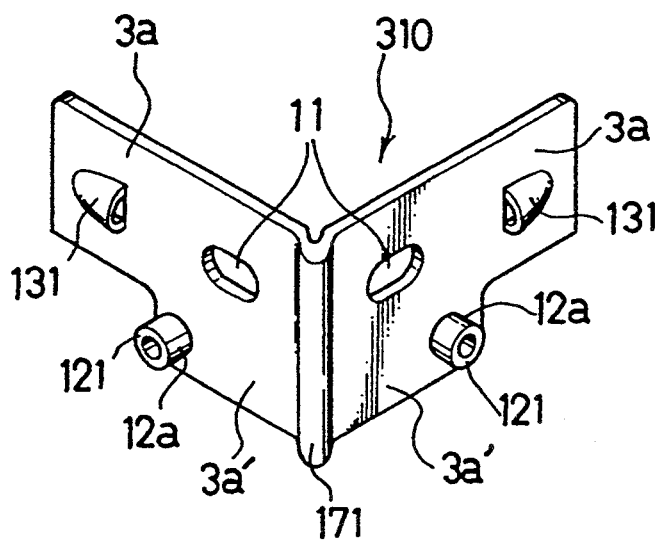
FIG. 23 is a perspective view showing a tenth corner bracket embodying the invention.

FIG. 23 is a perspective view showing a tenth corner bracket 310 embodying the invention. In this embodiment, a side face 3a of the corner bracket 310 extends downward at a corner portion to thereby form a reinforcing side face 3a' as illustrated. At a leading lateral end of the reinforcing side face 3a' is provided a projecting piece 121 which is a hollow cylindrical member projecting outward. Being of the cylindrical form, the projecting piece 121 is sturdy. Thus, the projecting pieces 121 in contact with the lateral edges of the side walls 5 of the strut 1 are capable of suppressing the undesirable lateral shaking of the shelf board 2 in the assembled shelf.

Figure 24:
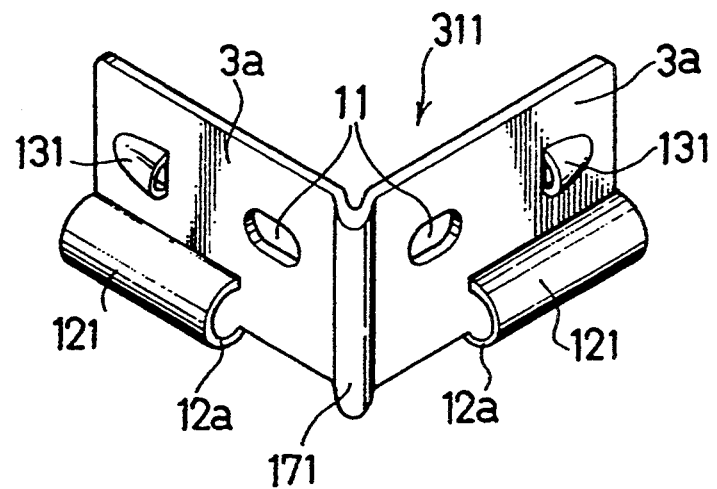
FIG. 24 is a perspective view showing an eleventh corner bracket embodying the invention.

FIG. 24 is a perspective view showing an eleventh corner bracket 311 embodying the invention. In this embodiment, each side face 3a of the corner bracket 311 extends downward at a lower leading end portion, and the extended portion is turned up to form a semi-cylindrical projecting piece 121 projecting outward.

At a lateral end of this projecting piece 121 close to the corner portion of the corner bracket 311 is formed a semicircular engaging side face 12a. The semicircular engaging side faces 12a of the corner bracket 311 are in contact with the lateral edges of the side walls 5 of the corresponding strut 1 in the assembled shelf.

Accordingly, a compressive force subjected to the engaging side face 12a is transmitted to the side face 3a through an upper edge of the bent projecting piece 121. Therefore, the corner bracket 311 is capable of resisting against the compressive force and, in this respect, is capable of preventing reliably lateral shaking of the sectional shelf in the assembled state.

Figure 25:
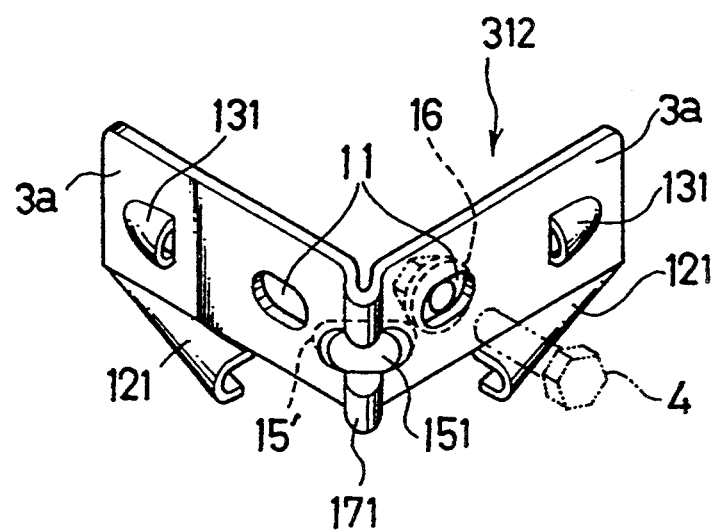
FIG. 25 is a perspective view showing a twelfth corner bracket embodying the invention.

FIG. 25 is a perspective view showing a twelfth corner bracket 312 embodying the invention. In this embodiment, a ridge portion 171 of the corner bracket 312 is caved in at a center to thereby form a shallow recessed portion 151. The recessed portion 151 provides a stepped portion 15' projecting inward at an inner corner portion of the corner bracket 312, thereby deforming the corner portion.

Incidentally, at opposite sides of the stepped portion 15' are formed insertion holes 11 through which mount bolts 4 are inserted. Thus, when the mount bolts 4 are fastened with nuts 16 in assembling the shelf, the edges of the nuts 16 comes to contact with the stepped portion 15' provided inward of the holes 11. This causes the opposite side faces 3a to be pulled forward, and the projected portions 131 provided at the side faces 3a move toward the corner portion of the corner bracket 312 and are brought to pressing contact with the inner edges of the engaging holes 10 defined in the side boards 8 of the shelf board 2. In this way, the shelf can be joined further strongly.

The twelfth corner bracket 312 shown in FIG. 25 is basically similar to the fifth corner bracket shown in FIG. 13. However, the feature of the twelfth embodiment may be also applied to other illustrated corner brackets.

Figure 26:
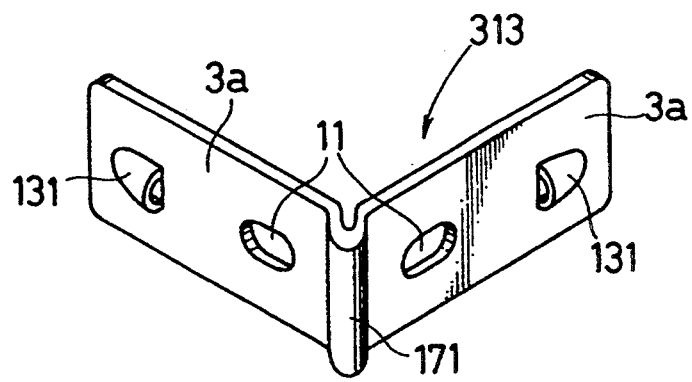
FIG. 26 is a perspective view showing a thirteenth corner bracket embodying the invention.

FIG. 26 is a perspective view showing a thirteenth corner bracket 313 embodying the invention. In this embodiment, the projecting piece 121 as shown in FIGS. 13 to 25 is not provided at a lower end portion of a side face 3a. An insertion hole 11 and a projected portion 131 are provided on the side face 3a, and a ridge portion 171 is provided at a corner portion of the corner bracket 313. In other words, this embodiment pertains to the reliable coupling of the sectional shelf mainly by the presence of the ridge portion 171. The function of the ridge portion 171 in the state where the corner bracket 313 is assembled into the sectional shelf is described in the fifth embodiment with reference to FIGS. 13 and 14.

Figure 27:
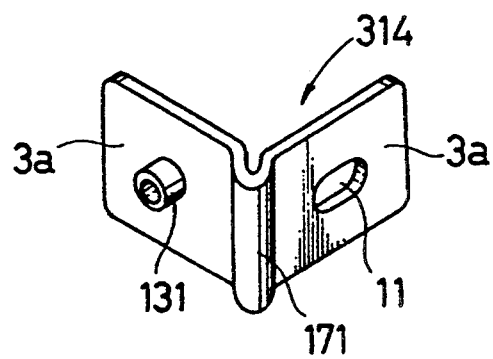
FIG. 27 is a perspective view showing a fourteenth corner bracket embodying the invention.

FIG. 27 is a perspective view showing a fourteenth corner bracket 314 embodying the invention. This embodiment is of the mini-type wherein no projecting piece 121 is provided. The horizontal length of a side face 3a of this embodiment is about the half of the horizontal length of the side face 3a of the thirteenth embodiment. A projected portion 131 such as a bar ring is provided on one side face 3a, whereas an insertion hole 11 is defined on the other side face 3a. At a corner portion of the corner bracket 314 is provided a ridge portion 171, which is fitted in a clearance 2a formed at a corner portion of a shelf board 2 in the assembled shelf so as to make the coupling effect more reliable as described above.

In the corner bracket 314 shown in FIG. 27, the bar ring is illustrated as a projected portion 131. However, the projected portion 131 is not particularly limited to the form of a bar ring, but may be any suitable form such as a cut-up piece cut up in the vertical or horizontal direction.

In the thirteenth and fourteenth embodiments, a recessed portion 151 as of the twelfth embodiment shown in FIG. 25 may be provided at the center of the ridge portion 171. The effect the recessed portion 151 brings about is as described in the twelfth embodiment.

Figure 28:
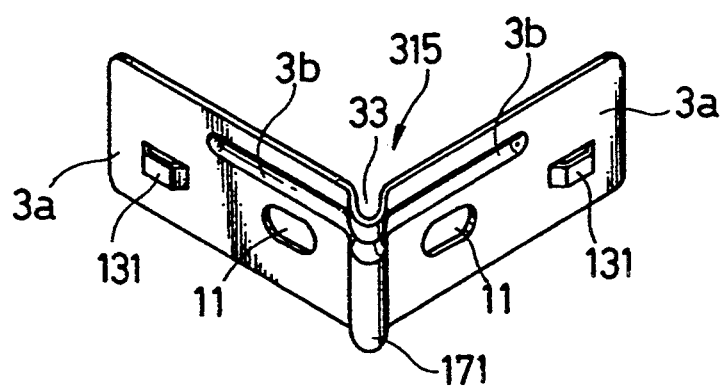
FIG. 28 is a perspective view showing a fifteenth corner bracket embodying the invention.
Figure 29:
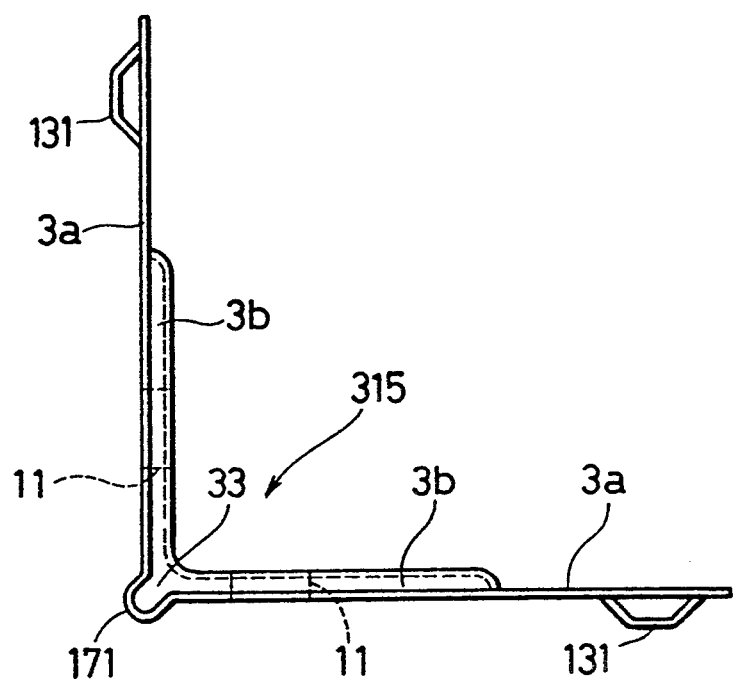
FIG. 29 is a plan view showing the fifteenth corner bracket shown in FIG. 28.
Figure 30:
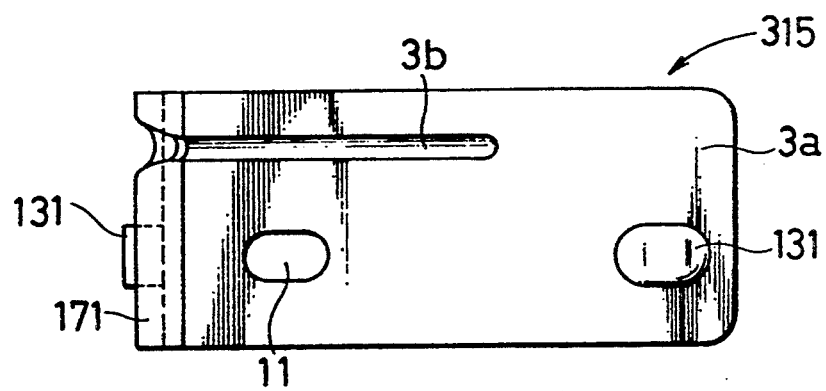
FIG. 30 is a side view showing the fifteenth corner bracket shown in FIG. 28.

FIGS. 28 to 30 are a perspective view, a plan view, and a side view showing a fifteenth corner bracket 315 embodying the invention respectively. As shown in these figures, this embodiment is similar to the thirteenth corner bracket 313 shown in FIG. 26 except for a reinforcing projected portion 3b which projects inward and extends laterally to left and right side faces 3a from a corner portion 33.

With the reinforcing projected portion 3b extending laterally over the inner surface of the corner bracket 315 from the corner portion 33 to the left and right side faces 3a, the corner bracket 315 is reinforced against a force to bend the corner bracket 315 around the corner portion 33. Thus, the corner bracket 315 becomes sturdy against such a force and is not subject to deformation due to an external force. Particularly, with the reinforcing projected portion 3b, each corner portion of the shelf is allowed to maintain a right angular state when viewed from above.

The reinforcing projected portion 3b can be applied not only to the thirteenth corner bracket 313 but also to a corner bracket of any type, and the effect it brings about is same as the one described in the fifteenth embodiment.

Figure 31:
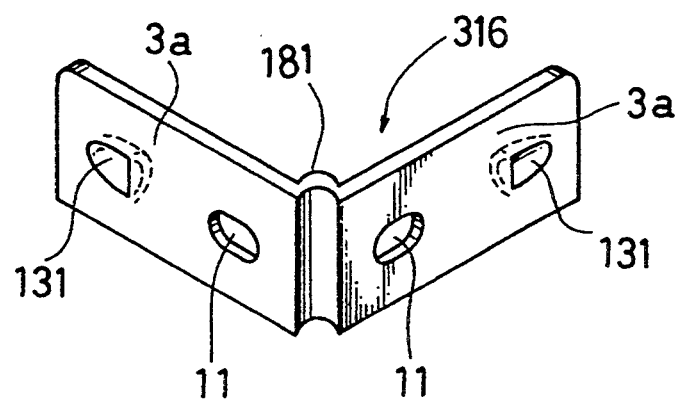
FIG. 31 is a perspective view showing a sixteenth corner bracket embodying the invention.

FIG. 31 is a perspective view showing a sixteenth corner bracket 316 embodying the invention. The corner bracket 316 of this embodiment is of the type which is disposed between the shelf board 2 and the strut 1. In this embodiment, a vertically extending recessed portion 181 which is caved inward is formed at a corner portion instead of the ridge portion 171. On each side face 3a are formed an insertion hole 11 and a projected portion 131 similar to the other embodiments.

In a state where the corner bracket 316 is assembled in the sectional shelf, the recessed portion 181 is fitted in the clearance 2a defined between the side boards 8 of the shelf board 2, thereby realizing the reliable coupling.

Figure 32:
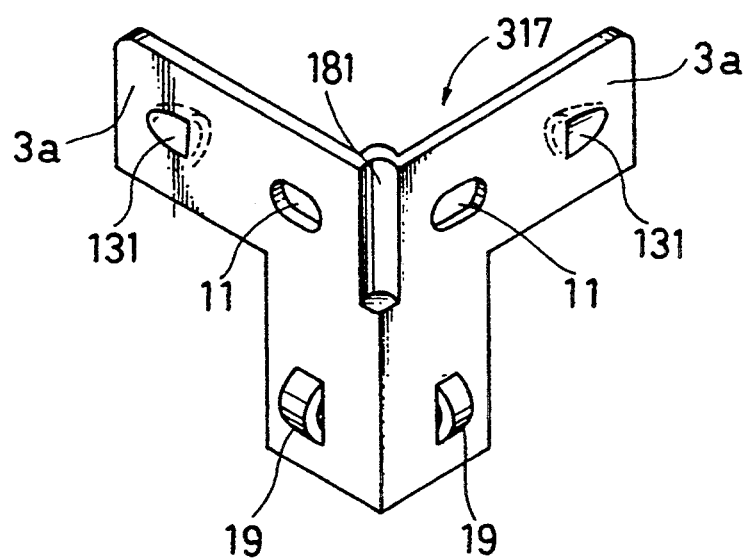
FIG. 32 is a perspective view showing a seventeenth corner bracket embodying the invention.

FIG. 32 is a perspective view showing application (seventeenth embodiment) of the sixteenth embodiment. In this embodiment, a vertically extending recessed portion 181 is formed at a corner portion of a corner bracket 317 similar to the sixteenth embodiment, and each side face 3a of the corner bracket 317 extends downward from a lower base end. On this downward extended portion of the side face 3a is formed a projected portion 19 which is engageable with the engaging hole 6 of the strut 1. With the downward extended portions of the side faces 3a, an area where the corner bracket 317 is in contact with the inner surface of the strut 1 can be increased in a state where the corner bracket 317 is assembled into the sectional shelf, and more satisfactory coupling is realized since the projected portions 19 are engaged with the engaging holes 6 of the strut 1.

Figure 33:
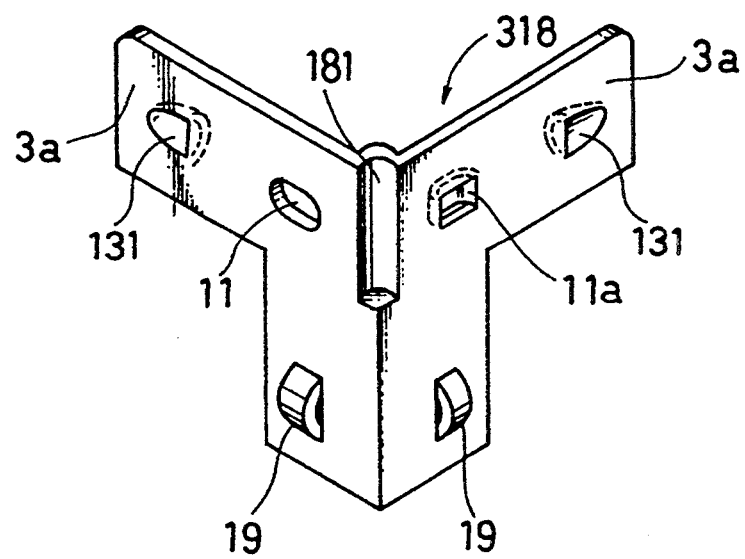
FIG. 33 is a perspective view showing an eighteenth corner bracket embodying the invention.

FIG. 33 is a perspective view showing an eighteenth corner bracket 318 embodying the invention. This embodiment is similar to the seventeenth embodiment except that an inward projecting piece 11a is formed instead of the insertion hole 11 in one side face 3a. Since this projecting piece 11a is engaged with the insertion hole 9 of the shelf board 2 when the corner bracket 318 is assembled into the sectional shelf, it is not necessary to fasten that portion with a bolt. Thus, this arrangement is advantageous in reducing the number of bolts.

Figure 34:
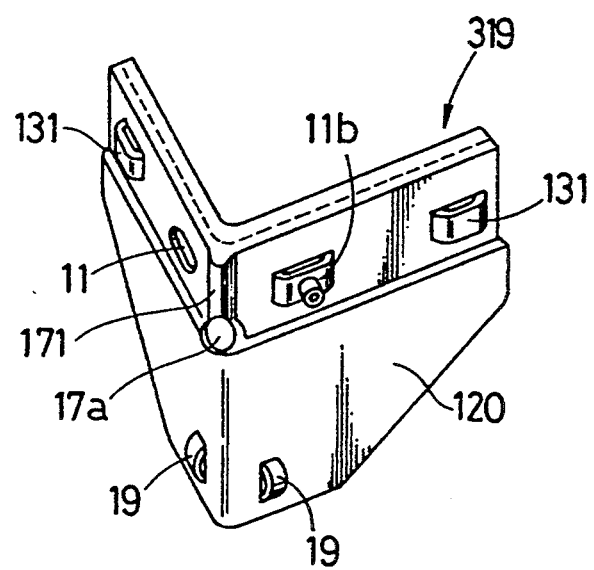
FIG. 34 is a perspective view showing a nineteenth corner bracket embodying the invention.
Figure 35:
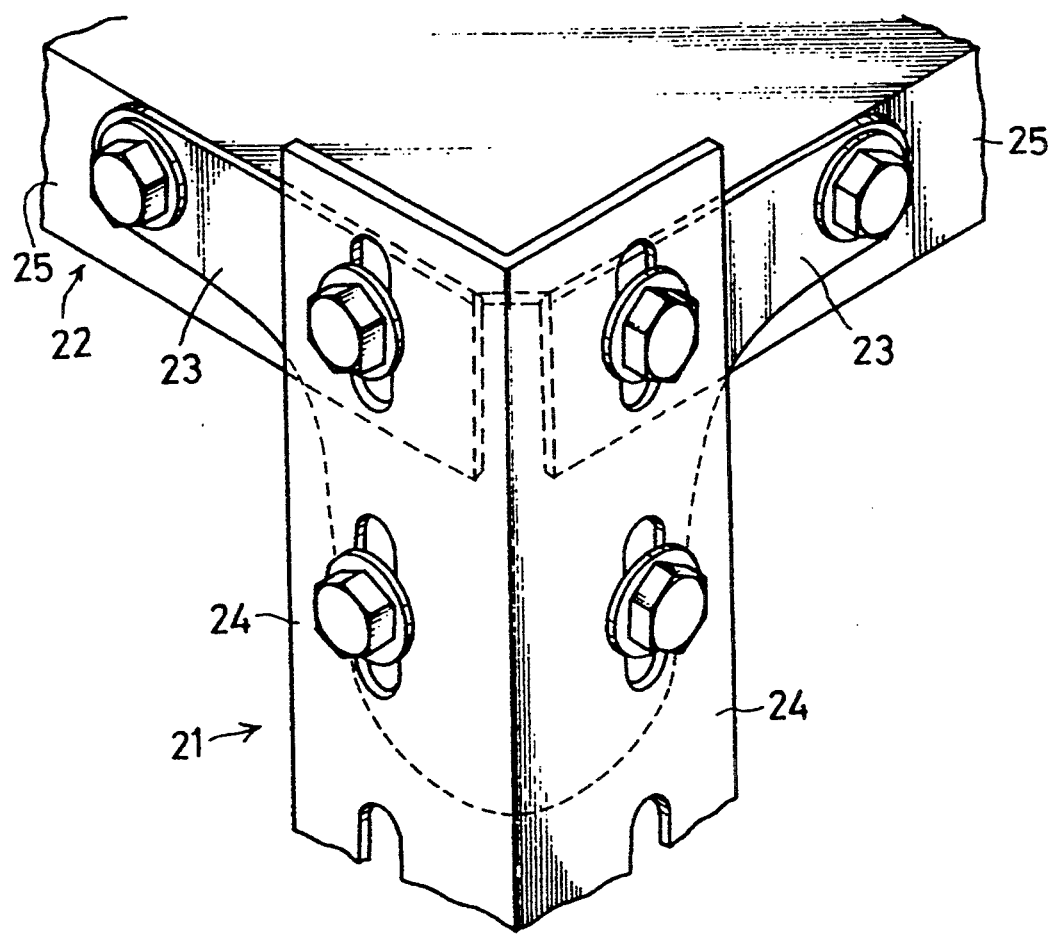
FIG. 35 is a perspective view showing an exemplary corner bracket of the prior art.
Figure 36:
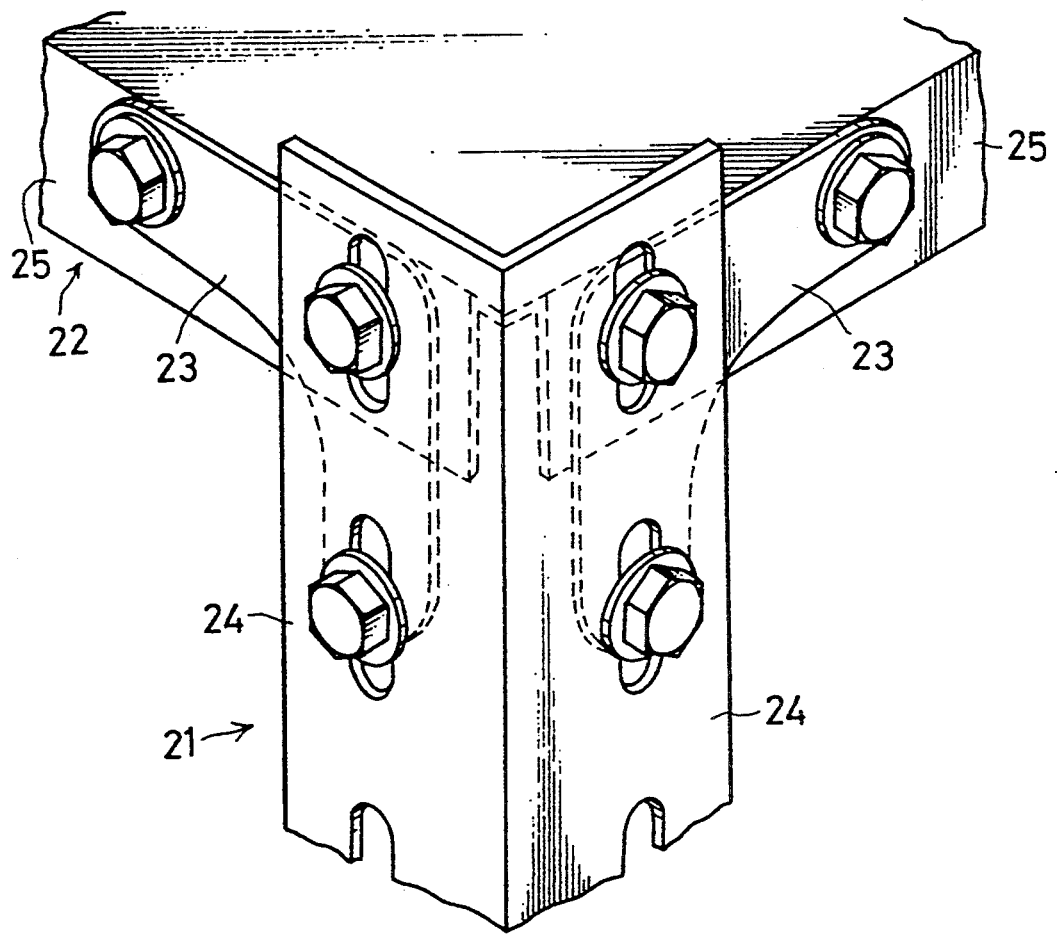
FIG. 36 is a perspective view showing another exemplary corner bracket of the prior art.

FIG. 34 is a perspective view showing a nineteenth corner bracket 319 embodying the invention. In this embodiment, a large stepped portion 120 projecting outward is formed at a lower portion of the corner bracket 319. Further, an insertion hole 17a is defined at a boundary between a ridge portion 171 formed at a corner portion and the stepped portion 120.

An outward projecting piece 11b is formed instead of the insertion hole 11 in one side face 3a of the corner bracket 319. Since this projecting piece 11b is engaged with both the insertion hole 9 of the shelf board 2 and the engaging hole 6 of the strut 1 when the corner bracket 319 is assembled into the sectional shelf, it is not necessary to fasten that portion with a bolt. Thus, this arrangement is advantageous in reducing the number of bolts.

Further in this embodiment, the insertion hole 17a is defined at the corner portion so as to insert a coupling member such as a bolt therethrough. Thus, another projecting piece 11b may be formed instead of the remaining insertion hole 11. This projecting piece 11b is also engageable with both the insertion hole 9 of the shelf board 2 and the engaging hole 6 of the strut 1, and the coupling member is inserted only through the insertion hole 17a to couple the sectional shelf.

In the foregoing embodiments, the nut 16 is spirally fitted to the mount bolt 4 as a coupling member in a state where the mount bolt 4 is inserted through the engaging hole 6 of the strut 1, the insertion hole 9 of the shelf board 2, and the insertion hole 11 of the corner bracket, thereby fastening the mount bolt 4 so as to join the strut 1, the shelf board 2, and the corner bracket with one another. However, these members may be joined with one another by making the insertion hole 11 of the corner bracket round, forming an internal thread at an edge defining the round hole 11, and fitting the mount bolt 4 spirally to the round hole. This arrangement reduces conveniently the number of members constituting the invention since the coupling with the mount bolt 4 can be made without the nut 16.

As described above, a corner bracket for use in a sectional shelf according to the invention is provided at an upper portion thereof with a common insertion hole through which a mount bolt is inserted to fix a strut, and a shelf board and a board projected portion for engaging the corner bracket with the shelf board. The common insertion hole and the board projected portion are spaced apart horizontally. The corner bracket is also provided with a strut projected portion for engaging the corner bracket with the strut below the common insertion hole. The corner bracket is constructed such that a side face thereof extends outside a line connecting the two projected portions (clamping line). Accordingly, when an external force is subjected to the shelf board of the sectional shelf in a state where this corner bracket is disposed at a joint portion of the strut and the shelf board, the corner bracket is not bendingly deformed by the presence of the side face along the clamping line. (Contrary to this, since no member exists along the clamping line in the existing corner bracket, the stress is concentrated on the vicinity of the common insertion hole and therefore the existing corner bracket is liable to be bendingly deformed.)

Accordingly, this corner bracket has sufficient rigidity, and is advantageous in holding the sectional shelf entirely strongly without exhibiting bending deformation.

Each strut of the sectional shelf may include a wide wall having a multitude of engaging holes arranged vertically, and each shelf board of the sectional shelf may include a side board having an insertion hole defined in a position corresponding to the common engaging portion of the corner bracket and having an engaging hole defined in a position corresponding to the board projected portion. When the corner bracket is applied to the above structured sectional shelf, the board engaging portion consists essentially of an engaging hole defined in the shelf board and a projecting body engageable with this engaging hole, and the strut engaging portion consists essentially of an engaging hole defined in the side wall of the strut and a projecting body engageable with this engaging hole.

This corner bracket is mounted at the joint portion of the strut and the shelf board by engaging the board and strut projected portions with the engaging hole defined in side board of the shelf board and the engaging hole defined in the strut, inserting and fastening a coupling member such as a bolt through the common engaging portion of the corner bracket, the insertion hole of the shelf board, and the engaging hole of the strut.

An outward projecting stepped portion which comes into contact with a side wall of the strut may be formed at a lower end portion of the corner bracket to thereby form a contact edge for supporting the side board of the shelf board at an upper edge of this stepped portion in the assembled sectional shelf. The contact of the stepped portion with the inner surface of the side wall of the strut generates frictional resistance. The strut and the shelf board can be joined more strongly by this frictional resistance and the support given to the shelf board from the upper edge of the stepped portion, which prevents effectively the shelf board from shaking.

If the stepped portion is formed to project inward at the lower portion of the side face of the corner bracket and the contact edge for supporting the side board of the shelf board is formed at an upper edge of this stepped portion, this corner bracket can be held tightly between the strut and the shelf board. Further, since the side board of the shelf board is supported by this contact edge, the shaking of the shelf board can be suppressed effectively.

If the corner bracket is bent at a right angle along a vertical center line laterally symmetrically, the corner bracket can be mounted on two faces of a corner portion of the sectional shelf by one mounting operation. In addition, since the left and right side faces work to reinforce each other, the strut and the shelf board can be joined more strongly.

The above corner bracket may be cut along the vertical center line and separated into two planer corner brackets. In this case, the shelf board can be joined with the strut with either of two corner brackets.

The strut engaging portion may comprise a projecting piece which is formed at a lower end of the side face and comes into contact with the lateral edge of the side wall of the strut.

Thus constructed corner bracket is mounted at the joint portion of the strut and the shelf board by engaging the board projected portion with the engaging hole defined in the side board of the shelf board, bringing the end of the projecting piece into contact with the lateral edge of the side wall of the strut, and inserting the fastening a coupling member such as a bolt through the common engaging portion of the corner bracket, the insertion hole of the shelf board, and the engaging hole of the strut.

In the case where the corner portion is bent at an obtuse angle, the opposite side faces are subjected to such a force as to push them inward making the obtuse angle of the corner portion a right angle in the state where this corner bracket is mounted at the joint portion of the shelf board and the strut. As a result, a restoring force for restoring the angle of the corner into the obtuse angle is generated and subjected to the side boards of the shelf board. This creates a frictional force between the corner bracket and the side boards of the shelf board, to thereby increase the coupling force.

Further, since the side face of the corner bracket extends outside the clamping line connecting the board projected portion and the portion of the projecting piece in contact with the lateral edge of the side wall, the stress does not concentrate on any particular point of the corner bracket even when an external force is subjected to the shelf board in the state where the corner bracket is mounted at the joint portion of the strut and the shelf board.

Accordingly, this corner bracket has sufficient rigidity, and is advantageous in holding the sectional shelf entirely strongly without exhibiting bending deformation.

The lower end portion of each side face of the corner bracket may be curled into a laterally long semi-cylindrical or semi-conic figure projecting outward so as to form a projecting piece. This projecting piece exhibits improved rigidity and is capable of resisting against a force subjected to an end thereof which is brought into contact with the lateral edge of the strut. Thus, the lateral shaking of the shelf board can be prevented reliably and strongly by bringing the ends of the projecting pieces into contact with the opposite lateral edges of the strut.

If the projecting piece is formed by bending outward a downward extending portion of each side face whose lateral length is more than half the lateral length of the side face, the projecting piece exhibits the same improved rigidity as the above one.

The projecting piece may be a cylindrical form projecting outward from the side face of the corner bracket. This projecting piece is exceedingly sturdy.

If a ridge portion projecting outward is formed at the corner portion of the corner bracket, this ridge portion is fitted in a clearance defined between the side boards at the corner of the shelf board and an outer edge thereof comes to contact with the inner corner portion of the strut when the corner bracket is assembled into the sectional shelf. Accordingly, the provision of the ridge portion prevents effectively the lateral shaking of the shelf board.

If a recessed portion caved inward is formed at a center of the ridge portion, a stepped portion projecting inward and having the corresponding side of this recessed portion is formed at an inner corner portion of the corner bracket, thereby deforming this corner portion. When the mount bolt is fastened with nuts in assembling the shelf, the edge of the nut or head of the bolt comes to contact with the stepped portion. Thereby, the shelf board can be joined with the strut further strongly.

If an upper projecting piece which projects outward is formed at an upper lateral end of each side face of the corner bracket, the upper projecting piece is in contact with an upper inner surface of the side board of the shelf board. Accordingly, the corner bracket is open obliquely upward relative to the strut and the side boards of the shelf board. When a coupling member such as a mount bolt is fastened in this state, the upper projecting pieces are pressed against the inner surfaces of the side boards of the shelf board strongly. As a result, further stronger coupling of the sectional shelf is realized.

If the corner bracket is formed with a reinforcing projected portion which projects inward and extends laterally to left and right side faces from the corner portion, the corner bracket is reinforced against a force to bend the corner bracket around the corner portion. Thus, this corner bracket is not subject to deformation caused by the external force.

The corner bracket may be formed at the side face thereof with a projecting piece which projects inward, outward, or both inward and outward and is engageable with the insertion hole defined in the side wall of the shelf board. With this arrangement, a coupling member such as a bolt at that portion can be dispensed with by engaging this projecting piece with the insertion hole of the shelf board and the engaging hole of the strut through which the coupling member such as the bolt are normally inserted to join the shelf board and the strut.

Although the present invention has been fully described by way of example with reference to the accompanying drawings, it is to be understood that various changes and modifications will be apparent to those skilled in the art. Therefore, unless such changes and modifications otherwise depart from the scope of the present invention, they should be construed as being included therein.

What is claimed is:

1. A corner bracket for use in a sectional shelf including four struts and a plurality of shelf boards fixed and arranged vertically on the four struts at specified intervals, the corner bracket mountable at each joint portion of the strut and the shelf board, and comprising:
    a side face;
    a common engaging portion through which coupling means is inserted to fix the corresponding strut and shelf board;
    a board engaging portion for engaging the corner bracket with the corresponding shelf board, the common engaging portion and the engaging portion being spaced horizontally at an upper portion of the corner bracket;
    a strut engaging portion located below the common engaging portion and adapted for engaging the corner bracket with the corresponding strut; and
    a stepped portion projecting outward and formed at a lower portion of the side face;
    the side face extending outside a line connecting the board engaging portion with the strut engaging portion; wherein
    each strut of the sectional shelf includes a wide wall having a multitude of engaging holes arranged vertically;
    each shelf board of the sectional shelf includes a side board, the side board having an insertion hole defined in a position corresponding to the common engaging portion of the corner bracket and having an engaging hole defined in a position corresponding to the board engaging portion;
    the board engaging portion of the corner bracket consists essentially of the engaging hole defined in the shelf board and a projecting body engageable with this engaging hole;
    the strut engaging portion of the corner bracket consists essentially of the engaging hole defined in the side wall of the strut and a projecting body engageable with this engaging hole; and
    an upper edge of the stepped portion serves as a contact edge on which the corresponding side board of the shelf board is supported.

2. A corner bracket according to claim 1 wherein the corner bracket is bent at a right angle along a vertical center line thereof laterally symmetrically, or cut along the vertical center line laterally symmetrically.

3. A corner bracket for use in a sectional shelf including four struts and a plurality of shelf boards fixed and arranged vertically on the four struts at specified intervals, the corner bracket mountable at each joint portion of the strut and the shelf board, and comprising:
    a side face;
    a common engaging portion through which coupling means is inserted to fix the corresponding strut and shelf board;
    a board engaging portion for engaging the corner bracket with the corresponding shelf board, the common engaging portion and the engaging portion being spaced horizontally at an upper portion of the corner bracket;
    a strut engaging portion located below the common engaging portion and adapted for engaging the corner bracket with the corresponding strut; and
    a stepped portion projecting outward and formed at a lower portion of the side face; wherein
    each strut of the sectional shelf includes a wide wall having a multitude of engaging holes arranged vertically;
    each shelf board of the sectional shelf includes a side board, the side board having an insertion hole defined in a position corresponding to the common engaging portion of the corner bracket and having an engaging hole defined in a position corresponding to the board engaging portion;
    the board engaging portion of the corner bracket consists essentially of the engaging hole defined in the shelf board and a projecting body engageable with this engaging hole;
    the strut engaging portion of the corner bracket consists essentially of the engaging hole defined in the side wall of the strut and a projecting body engageable with this engaging hole; and
    an upper edge of the stepped portion serves as a contact edge on which the corresponding side board of the shelf board is supported.

* * * * *